(12) United States Patent
Zhang et al.

(10) Patent No.: US 10,826,688 B2
(45) Date of Patent: Nov. 3, 2020

(54) KEY DISTRIBUTION AND RECEIVING METHOD, KEY MANAGEMENT CENTER, FIRST NETWORK ELEMENT, AND SECOND NETWORK ELEMENT

(71) Applicant: Huawei Technologies Co., Ltd., Shenzhen (CN)

(72) Inventors: Bo Zhang, Shenzhen (CN); Lu Gan, Shenzhen (CN); Philip Ginzboorg, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 288 days.

(21) Appl. No.: 15/905,494

(22) Filed: Feb. 26, 2018

(65) Prior Publication Data

US 2018/0198605 A1   Jul. 12, 2018

Related U.S. Application Data

(63) Continuation of application No. PCT/CN2016/096367, filed on Aug. 23, 2016.

(30) Foreign Application Priority Data

Aug. 27, 2015 (CN) .......................... 2015 1 0534516

(51) Int. Cl.
*H04W 12/04* (2009.01)
*H04L 9/08* (2006.01)
(Continued)

(52) U.S. Cl.
CPC .............. *H04L 9/0819* (2013.01); *H04L 9/08* (2013.01); *H04L 9/14* (2013.01); *H04L 63/06* (2013.01);
(Continued)

(58) Field of Classification Search
None
See application file for complete search history.

(56) References Cited

U.S. PATENT DOCUMENTS

| 9,736,686 | B2 * | 8/2017 | Wifvesson | ............ H04W 12/04 |
| 2006/0182280 | A1 * | 8/2006 | Laitinen | .................. H04L 63/06 380/247 |

(Continued)

FOREIGN PATENT DOCUMENTS

| CN | 101090513 A | 12/2007 |
| CN | 101141792 A | 3/2008 |

(Continued)

OTHER PUBLICATIONS

Seamless Authentication Across Heterogeneous Networks using Generic Boostrapping Systems. Targali. IEEE. (Year: 2013).*

(Continued)

*Primary Examiner* — Venkat Perungavoor
(74) *Attorney, Agent, or Firm* — Slater Matsil, LLP

(57) ABSTRACT

A key distribution and receiving method includes obtaining, by a first key management center, NAF key information of the first network element and a NAF key of the first network element, wherein the NAF key information of the first network element is information required to obtain the NAF key of the first network element. A service key is obtained. Using the NAF key of the first network element to perform encryption and/or integrity protection on the service key, a first security protection parameter is generated. A first generic bootstrapping architecture GBA push message is sent to the first network element. The GBA push message carries the first security protection parameter and the NAF key information of the first network element.

20 Claims, 17 Drawing Sheets

(51) Int. Cl.
  *H04L 29/06* (2006.01)
  *H04L 9/14* (2006.01)
  *H04L 29/08* (2006.01)
  *H04W 12/08* (2009.01)
(52) U.S. Cl.
  CPC ............ *H04L 63/061* (2013.01); *H04L 67/26* (2013.01); *H04W 12/04031* (2019.01)

(56) References Cited

U.S. PATENT DOCUMENTS

| | | | | |
|---|---|---|---|---|
| 2007/0086590 A1* | 4/2007 | Blom | ............... | H04L 9/0844 380/278 |
| 2007/0086591 A1* | 4/2007 | Blom | ............... | H04W 12/04 380/279 |
| 2009/0117877 A1* | 5/2009 | Yang | ............... | H04L 63/06 455/411 |
| 2011/0145583 A1* | 6/2011 | Holtmanns | ........... | H04W 12/04 713/171 |
| 2012/0252531 A1 | 10/2012 | King et al. | | |
| 2015/0163669 A1* | 6/2015 | Holtmanns | ........... | H04L 9/0869 726/6 |
| 2015/0281958 A1* | 10/2015 | Simplicio Junior | .. | H04W 12/04 713/155 |
| 2016/0044505 A1* | 2/2016 | Nishi | ............... | H04L 63/061 380/247 |

FOREIGN PATENT DOCUMENTS

| | | |
|---|---|---|
| CN | 101166259 A | 4/2008 |
| CN | 101366263 A | 2/2009 |
| CN | 101877834 A | 11/2010 |
| CN | 101990203 A | 3/2011 |
| CN | 102413464 A | 4/2012 |
| CN | 103051594 A | 4/2013 |
| CN | 104683304 A | 6/2015 |
| EP | 2785011 A1 | 10/2014 |
| EP | 2654332 B1 | 8/2016 |
| GB | 2518254 A | 3/2015 |
| WO | 2007042345 A1 | 4/2007 |
| WO | 2009004590 A2 | 1/2009 |

OTHER PUBLICATIONS

Seamless Authentication and Mobility Across Heterogeneous Networks using Federated Identity Systems. Targali. IEEE. (Year: 2013).*
Integrating Identity-Based Cryptography in IMS Service Authentication. Abid. IJNSA. (Year: 2009).*
CN101990201. English Translation. China Mobile Comm Corp. (Year: 2011).*
3GPP TS 33.223 V12.1.0 (Jun. 2015), "3rd Generation Partnership Project; Technical Specification Group Services and System Aspects; Generic Authentication Architecture (GAA);Generic Bootstrapping Architecture (GBA) Push function (Release 12)," Jun. 2015, 23 pages.
3GPP TS 33.224 V12.0.0 (Sep. 2014), "3rd Generation Partnership Project; Technical Specification Group Services and System Aspects; Generic Authentication Architecture (GAA); Generic Bootstrapping Architecture (GBA) Push Layer (Release 12)," Sep. 2014, 21 pages.

\* cited by examiner

KEY DISTRIBUTION AND RECEIVING METHOD, KEY MANAGEMENT CENTER, FIRST NETWORK ELEMENT, AND SECOND NETWORK ELEMENT

CROSS-REFERENCE TO RELATED APPLICATIONS

This application is a continuation of International Application No. PCT/CN2016/096367, filed on Aug. 23, 2016, which claims priority to Chinese Patent Application No. 201510534516.9, filed on Aug. 27, 2015. The disclosures of the aforementioned applications are hereby incorporated by reference in their entireties.

TECHNICAL FIELD

Embodiments of the present invention relate to the field of mobile communications technologies, and in particular, to a key distribution and receiving method, a key management center, a first network element, and a second network element.

BACKGROUND

In an existing mobile communications security architecture, data security protection is performed hop by hop from a network element to the Internet, that is, data is protected by means of encryption section by section. In addition, in an existing 2G/3G/4G mobile architecture, end-to-end communication data is also encrypted section by section. Although encryption section by section is flexible, an intermediate node may obtain plaintexts of communication data and the communication data cannot be prevented from being intercepted and attacked. Therefore, security of encryption section by section is poor.

For example, referring to FIG. 1. FIG. 1 is a schematic diagram of a protocol stack architecture of 4G LTE in the prior art. In FIG. 1, data sent by a user network element, such as user equipment (UE), to a packet data network (PDN) gateway (GW) starts from the UE, sequentially passes through a base station eNodeB and a serving GW, and arrives at the PDN GW. The data is encrypted and protected by using the packet data convergence protocol (PDCP) security protocol between the UE and the eNodeB, and by using the internet protocol security (IPSec) protocol between the eNodeB and the serving GW and between the serving GW and the PDN GW. Since the base station is located in an outdoor scenario, an attacker may crack the base station and wiretap, so as to obtain plaintext contents generated through PDCP protocol decryption.

SUMMARY

According to a first aspect, an embodiment of the present invention provides a key distribution method, including obtaining, by a first key management center, application server (NAF) key information of a first network element and a NAF key of the first network element, where the NAF key information of the first network element is information required to obtain the NAF key of the first network element. The key distribution method further includes obtaining, by the first key management center, a service key, where the service key is used for communication data encryption and/or integrity protection when the first network element communicates with a second network element. The NAF key of the first network element is used, by the first key management center, to perform encryption and/or integrity protection on the service key, to generate a first security protection parameter. The key distribution method also includes performing, by the first key management center, either of the following steps A or B. Step A includes sending a first generic bootstrapping architecture (GBA) push message to the first network element, where the first GBA push message carries the first security protection parameter and the NAF key information of the first network element. Step B includes sending a first GBA push message to a second key management center, so that the second key management center sends the first GBA push message to the first network element, or the second key management center sends the first GBA push message to the second network element, and the second network element sends the first GBA push message to the first network element, where the first GBA push message carries the first security protection parameter and the NAF key information of the first network element.

With reference to the first aspect, in a first possible implementation of the first aspect, when the first key management center performs the step A, the key distribution method further includes obtaining, by the first key management center, NAF key information of the second network element and a NAF key of the second network element, where the NAF key information of the second network element is information required to obtain the NAF key of the second network element. The NAF key of the second network element is used, by the first key management center, to perform encryption and/or integrity protection on the service key, to generate a second security protection parameter. The key distribution method further includes performing, by the first key management center, one of the following steps C, D, or E. Step C includes adding a second GBA push message to the first GBA push message, so that the first network element sends the second GBA push message to the second network element. Step D includes sending a second GBA push message to the first network element, so that the first network element sends the second GBA push message to the second network element. Step E includes sending a second GBA push message to the second network element. The key distribution method further includes that the second GBA push message carries the second security protection parameter and the NAF key information of the second network element.

With reference to the first aspect or the first possible implementation of the first aspect, in a second possible implementation of the first aspect, obtaining a service key may include selecting a random number, where the service key includes the random number. Obtaining a service key may instead include obtaining a first parameter set and a second parameter set, and calculating a dependent variable of a preset key derivation function when the first parameter set and the second parameter set are independent variables of the preset key derivation function, where the service key includes the dependent variable. Obtaining a service key may alternatively include obtaining the first parameter set and the second parameter set, where the service key includes the first parameter set and the second parameter set. In this aspect, the first parameter set includes at least one of the random number, the NAF key of the first network element, or the NAF key of the second network element, and the second parameter set includes at least one of an identity, time indicating a validity period of the service key, or a serial number.

With reference to the first aspect, in a third possible implementation of the first aspect, when the first key management center performs the step A, the key distribution method further includes receiving, by the first key management center, a second GBA push message sent by the second key management center, where the second GBA push message carries a second security protection parameter and NAF key information of the second network element; the NAF key information of the second network element is information required to obtain a NAF key of the second network element; and the second security protection parameter is generated by using the NAF key of the second network element to perform encryption and/or integrity protection on the service key by the second key management center. With reference to this implementation, the method further comprises performing, by the first key management center, one of the following steps F, G, or H. Step F includes adding the second GBA push message to the first GBA push message, so that the first network element sends the second GBA push message to the second network element. Step G includes sending the second GBA push message to the first network element, so that the first network element sends the second GBA push message to the second network element. Step H includes sending the second GBA push message to the second network element.

With reference to the third possible implementation of the first aspect, in a fourth possible implementation of the first aspect, obtaining a service key includes selecting a random number, where the service key includes the random number; negotiating the service key with the second key management center; receiving the service key sent by the second key management center; or obtaining a first parameter set and a second parameter set, and calculating a dependent variable of a preset key derivation function when the first parameter set and the second parameter set are independent variables of the preset key derivation function, where the service key includes the dependent variable. The first parameter set includes at least one of the random number determined by the first key management center or the NAF key of the first network element. The second parameter set includes at least one of an identity, time indicating a validity period of the service key, or a serial number.

With reference to the fourth possible implementation of the first aspect, in a fifth possible implementation of the first aspect, negotiating the service key with the second key management center may include receiving, a second random number and/or the NAF key of the second network element sent by the second key management center; and calculating a dependent variable of the preset key derivation function when at least one of the identity, the time indicating a validity period of the service key, the serial number, the random number determined by the first key management center, or the NAF key of the first network element and the second random number and/or the NAF key of the second network element are independent variables of the preset key derivation function, where the service key includes the dependent variable. Negotiating the service key with the second key management center may alternatively include obtaining a first random number; sending the first random number and/or the NAF key of the first network element to the second key management center; and receiving the service key sent by the second key management center, where the service key is determined by the second key management center according to the first random number and/or the NAF key of the first network element. Negotiating the service key with the second key management center may yet alternatively include negotiating the service key with the second key management center by using a Diffie-Hellman (DH) key negotiation method. Negotiating the service key with the second key management center may further alternatively include obtaining a negotiation parameter by negotiating with the second key management center by means of DH key negotiation; and calculating a dependent variable of the preset key derivation function when the negotiation parameter is one of independent variables of the preset key derivation function, where the service key includes the dependent variable.

With reference to the third possible implementation of the first aspect, in a sixth possible implementation of the first aspect, obtaining a service key includes obtaining a first parameter set and a second parameter set, where the service key includes the first parameter set and the second parameter set. The first parameter set includes at least one of a random number determined by the first key management center, a random number determined by the second key management center, the NAF key of the first network element, or the NAF key of the second network element. The second parameter set includes at least one of an identity, time indicating a validity period of the service key, or a serial number.

With reference to the first aspect, in a seventh possible implementation of the first aspect, a secure channel is established between the second network element and the first key management center; and when the first key management center performs the step A, the key distribution method further includes sending the service key to the second network element over the secure channel.

With reference to the first aspect, in an eighth possible implementation of the first aspect, the first GBA push message carries an identity of the first network element.

With reference to the eighth possible implementation of the first aspect, in a ninth possible implementation of the first aspect, the first GBA push message carries a first GPI (GBA push information) message and the first GPI message carries the identity of the first network element. Alternatively, the first GBA push message carries a first GPL (generic push layer) message, and the first GPL message carries the identity of the first network element, or carries the identity of the first network element and length information of the identity.

With reference to the second possible implementation, the fourth possible implementation, the fifth possible implementation, the sixth possible implementation, and the eighth possible implementation of the first aspect, in a tenth possible implementation of the first aspect, the identity includes at least one of an international mobile subscriber identity (IMSI), a globally unique temporary identity (GUTI), an IP multimedia private identity (IMPI), a temporary mobile station identity (TMSI), a temporary IP multimedia private identity (TMPI), an IP multimedia public identity (IMPU), a service identification (ID), a session ID, a network ID, a link ID, an App ID, or a gateway ID.

With reference to the first aspect, in an eleventh possible implementation of the first aspect, before obtaining an application server NAF key of the first network element, the key distribution method further includes receiving, by the first key management center, a communication request sent by an initiator, where the communication request is used to apply for a service key for data communication between the first network element and a second network element, the initiator is a data sender in the first network element and the second network element, and the communication request includes an identity of the first network element and an identity of the second network element.

With reference to the first aspect, in a twelfth possible implementation of the first aspect, the first GBA push message further carries identity information of the service key. Also, the identity information includes at least one of time indicating a validity period of the service key, an identity of the first network element, an identity of the second network element, or a service ID, where the service ID is used to indicate a service corresponding to the service ID when the service key is applied to the service.

According to a second aspect, an embodiment of the present invention provides a key receiving method, including receiving, by a first network element, a first GBA push message from a key management center, where the first GBA push message carries a first security protection parameter and first NAF key information that are of the first network element. The method further includes calculating, by the first network element, a first NAF key according to the first NAF key information. The method also includes decrypting, by the first network element, the first security protection parameter according to the first NAF key, to obtain a service key, where the service key is used for communication data encryption and/or integrity protection when the first network element communicates with a second network element.

With reference to the second aspect, in a first possible implementation of the second aspect, the first GBA push message further carries a second GBA push message, or the first network element further receives a second GBA push message sent by the key management center, where the second GBA push message includes a second security protection parameter and second NAF key information that are of the second network element. The NAF key information of the second network element is information required to obtain a NAF key of the second network element. The second security protection parameter is generated by using the NAF key of the second network element to perform encryption and/or integrity protection on the service key by the key management center. The method further includes sending the second GBA push message to the second network element.

With reference to the first possible implementation of the second aspect, in a second possible implementation of the second aspect, the second GBA push message further carries an identity of the second network element. Sending the second GBA push message to the second network element includes obtaining the identity of the second network element from the second GBA push message, and sending the second GBA push message to the second network element corresponding to the identity.

With reference to the second aspect, in a third possible implementation of the second aspect, before receiving a first GBA push message from a key management center, the key receiving method further includes sending, by the first network element, a communication request to the key management center, where the communication request is used to apply for a service key for the first network element and a second network element, and the communication request includes an identity of the first network element, an identity of the second network element, and a service ID.

According to a third aspect, an embodiment of the present invention provides a key receiving method, including receiving, by a second network element, a second GBA push message from a first network element, where the second GBA push message carries a second security protection parameter and second NAF key information that are of the second network element. The method further includes calculating, by the second network element, a second NAF key according to the second NAF key information. The method also includes decrypting, by the second network element, the second security protection parameter according to the second NAF key, to obtain a service key, where the service key is used for communication between the first network element and the second network element.

According to a fourth aspect, an embodiment of the present invention provides a first key management center including a first obtaining module, configured to obtain application server NAF key information of a first network element and a NAF key of the first network element, where the NAF key information of the first network element is information required to obtain the NAF key of the first network element. The key management center further includes a second obtaining module, configured to obtain a service key, where the service key is used for communication data encryption and/or integrity protection when the first network element communicates with a second network element. The key management center also includes a first generation module, configured to use the NAF key of the first network element to perform encryption and/or integrity protection on the service key, to generate a first security protection parameter. The key management center further still includes a first sending module, configured to perform either of the following steps A or B. Step A includes sending a first generic bootstrapping architecture GBA push message to the first network element, where the first GBA push message carries the first security protection parameter and the NAF key information of the first network element. Step B includes sending a first GBA push message to a second key management center, so that the second key management center sends the first GBA push message to the first network element, or the second key management center sends the first GBA push message to the second network element, and the second network element sends the first GBA push message to the first network element, where the first GBA push message carries the first security protection parameter and the NAF key information of the first network element.

With reference to the fourth aspect, in a first possible implementation of the fourth aspect, when the first sending module is configured to perform the step A, the first key management center further includes a third obtaining module, configured to obtain NAF key information of the second network element and a NAF key of the second network element, where the NAF key information of the second network element is information required to obtain the NAF key of the second network element. The first key management center also includes a second generation module, configured to use the NAF key of the second network element to perform encryption and/or integrity protection on the service key, to generate a second security protection parameter. The first sending module is further configured to perform one of the following steps C, D, or E. Step C includes adding a second GBA push message to the first GBA push message, so that the first network element sends the second GBA push message to the second network element. Step D includes sending a second GBA push message to the first network element, so that the first network element sends the second GBA push message to the second network element. Step E includes sending a second GBA push message to the second network element. The second GBA push message carries the second security protection parameter and the NAF key information of the second network element.

With reference to the fourth aspect or a first possible implementation of the fourth aspect, in a second possible implementation of the fourth aspect, the second obtaining module is specifically configured to select a random number, where the service key includes the random number. The second obtaining module is alternatively specifically configured to obtain a first parameter set and a second parameter set, and calculate a dependent variable of a preset key derivation function when the first parameter set and the second parameter set are independent variables of the preset key derivation function, where the service key includes the dependent variable. The second obtaining module is yet alternatively specifically configured to obtain the first parameter set and the second parameter set, where the service key includes the first parameter set and the second parameter set. The first parameter set includes at least one of the random number, the NAF key of the first network element, or the NAF key of the second network element. The second parameter set includes at least one of an identity, time indicating a validity period of the service key, or a serial number.

With reference to the fourth aspect, in a third possible implementation of the fourth aspect, when the first key management center is configured to perform the step A, the first key management center further includes a first receiving module, configured to receive a second GBA push message sent by the second key management center, where the second GBA push message carries a second security protection parameter and NAF key information of the second network element. The NAF key information of the second network element is information required to obtain a NAF key of the second network element. The second security protection parameter is generated by using the NAF key of the second network element to perform encryption and/or integrity protection on the service key by the second key management center. The first sending module is further configured to perform one of the following steps F, G, or H. Step F includes adding the second GBA push message to the first GBA push message, so that the first network element sends the second GBA push message to the second network element. Step G includes sending the second GBA push message to the first network element, so that the first network element sends the second GBA push message to the second network element. Step H includes sending the second GBA push message to the second network element.

With reference to the third possible implementation of the fourth aspect, in a fourth possible implementation of the fourth aspect, the second obtaining module is specifically configured to select a random number, where the service key includes the random number. The second obtaining module is alternatively specifically configured to negotiate the service key with the second key management center. The second obtaining module is yet alternatively specifically configured to receive the service key sent by the second key management center. The second obtaining module is further alternatively specifically configured to obtain a first parameter set and a second parameter set, and calculate a dependent variable of a preset key derivation function when the first parameter set and the second parameter set are independent variables of the preset key derivation function, where the service key includes the dependent variable. The first parameter set includes at least one of the random number determined by the first key management center or the NAF key of the first network element. The second parameter set includes at least one of an identity, time indicating a validity period of the service key, or a serial number.

With reference to the fourth possible implementation of the fourth aspect, in a fifth possible implementation of the fourth aspect, the second obtaining module is specifically configured to receive a second random number and/or the NAF key of the second network element sent by the second key management center, and to calculate a dependent variable of the preset key derivation function when at least one of the identity, the time indicating a validity period of the service key, the serial number, the random number determined by the first key management center, or the NAF key of the first network element and the second random number and/or the NAF key of the second network element are independent variables of the preset key derivation function, where the service key includes the dependent variable. The second obtaining module is alternatively specifically configured to obtain a first random number, to send the first random number and/or the NAF key of the first network element to the second key management center, and to receive the service key sent by the second key management center, where the service key is determined by the second key management center according to the first random number and/or the NAF key of the first network element. The second obtaining module is yet alternatively specifically configured to negotiate the service key with the second key management center by using a DH key negotiation method. The second obtaining module is further alternatively specifically configured to obtain a negotiation parameter by negotiating with the second key management center by means of DH key negotiation; and calculate a dependent variable of the preset key derivation function when the negotiation parameter is one of independent variables of the preset key derivation function, where the service key includes the dependent variable.

With reference to the third possible implementation of the fourth aspect, in a sixth possible implementation of the fourth aspect, the second obtaining module is specifically configured to obtain a first parameter set and a second parameter set, where the service key includes the first parameter set and the second parameter set. The first parameter set includes at least one of a random number determined by the first key management center, a random number determined by the second key management center, the NAF key of the first network element, or the NAF key of the second network element. The second parameter set includes at least one of an identity, time indicating a validity period of the service key, or a serial number.

With reference to the fourth aspect, in a seventh possible implementation of the fourth aspect, a secure channel is established between the second network element and the first key management center. When the first sending module is configured to perform the step A, the first sending module is further configured to send the service key to the second network element over the secure channel.

With reference to the fourth aspect, in an eighth possible implementation of the fourth aspect, the first GBA push message carries an identity of the first network element.

With reference to the eighth possible implementation of the fourth aspect, in a ninth possible implementation of the fourth aspect, the first GBA push message carries a first GPI message, and the first GPI message carries the identity of the first network element. The first GBA push message alternatively carries a first GPL message, and the first GPL message carries the identity of the first network element, or carries the identity of the first network element and length information of the identity.

With reference to the second possible implementation, the fourth possible implementation, the fifth possible implementation, the sixth possible implementation, and the eighth possible implementation of the fourth aspect, in a tenth possible implementation of the fourth aspect, the identity includes at least one of an IMSI, a GUTI, an IMPI, a TMSI, a TMPI, an IMPU, a service ID, a session ID, a network ID, a link ID, an App ID, or a gateway ID.

With reference to the fourth aspect, in an eleventh possible implementation of the fourth aspect, the first key management center further includes a second receiving module, configured to receive a communication request sent by an initiator before the first obtaining module obtains the application server NAF key of the first network element, where the communication request is used to apply for a service key for data communication between the first network element and a second network element, the initiator is a data sender in the first network element and the second network element, and the communication request includes an identity of the first network element and an identity of the second network element.

With reference to the fourth aspect, in a twelfth possible implementation of the fourth aspect, the first GBA push message further carries identity information of the service key; and the identity information includes at least one of time indicating a validity period of the service key, an identity of the first network element, an identity of the second network element, or a service ID; and the service ID is used to indicate a service corresponding to the service ID when the service key is applied to the service.

According to a fifth aspect, an embodiment of the present invention provides a first network element, including a first receiving module, configured to receive a first GBA push message from a key management center, where the first GBA push message carries a first security protection parameter and first NAF key information that are of the first network element. The first network element also includes a calculation module, configured to calculate a first NAF key according to the first NAF key information. The first network element further includes a decryption module, configured to decrypt the first security protection parameter according to the first NAF key, to obtain a service key, where the service key is used for communication data encryption and/or integrity protection when the first network element communicates with a second network element.

With reference to the fifth aspect, in a first possible implementation of the fifth aspect, the first GBA push message further carries a second GBA push message, or the first network element includes a second receiving module, configured to receive a second GBA push message sent by the key management center, where the second GBA push message includes a second security protection parameter and second NAF key information that are of the second network element. The NAF key information of the second network element is information required to obtain a NAF key of the second network element. The second security protection parameter is generated by using the NAF key of the second network element to perform encryption and/or integrity protection on the service key by the key management center. The first network element further includes a first sending module, configured to send the second GBA push message to the second network element.

With reference to the first possible implementation of the fifth aspect, in a second possible implementation of the fifth aspect, the second GBA push message further carries an identity of the second network element. The first sending module is specifically configured to obtain the identity of the second network element from the second GBA push message, and to send the second GBA push message to the second network element corresponding to the identity.

With reference to the fifth aspect, in a third possible implementation of the fifth aspect, the first network element further includes a second sending module, configured to send a communication request to the key management center, where the communication request is used to apply for a service key for the first network element and a second network element, and the communication request includes an identity of the first network element, an identity of the second network element, and a service ID.

According to a sixth aspect, an embodiment of the present invention provides a second network element, including a receiving module, configured to receive a second GBA push message from a first network element, where the second GBA push message carries a second security protection parameter and second NAF key information that are of the second network element. The second network element also includes a calculation module, configured to calculate a second NAF key according to the second NAF key information. The second network element also includes a decryption module, configured to decrypt the second security protection parameter according to the second NAF key, to obtain a service key, where the service key is used for communication between the first network element and the second network element.

It can be learned from the foregoing technical solutions that the embodiments of the present invention have the following advantages.

In embodiments of the present invention, the first key management center sends a service key for communication between network elements to the network elements, so that data can be protected by using the service key when the network elements send the data to each other and data interception and attack in a sending process can be avoided. In addition, the first key management center further uses a NAF key to encrypt the service key, and sends the service key to the network elements by using a GBA message. The GBA message further carries NAF key information, so that the network elements generate the NAF key according to the NAF key information, and use the NAF key to restore the service key from the GBA message. This ensures service key security.

BRIEF DESCRIPTION OF THE DRAWINGS

For a more complete understanding of embodiments of the present invention, and the advantages thereof, reference is now made to the following descriptions taken in conjunction with the accompanying drawings.

DETAILED DESCRIPTION OF ILLUSTRATIVE EMBODIMENTS

To make a person skilled in the art understand the technical solutions in the embodiments of the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present disclosure.

In the specification, claims, and accompanying drawings of embodiments of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
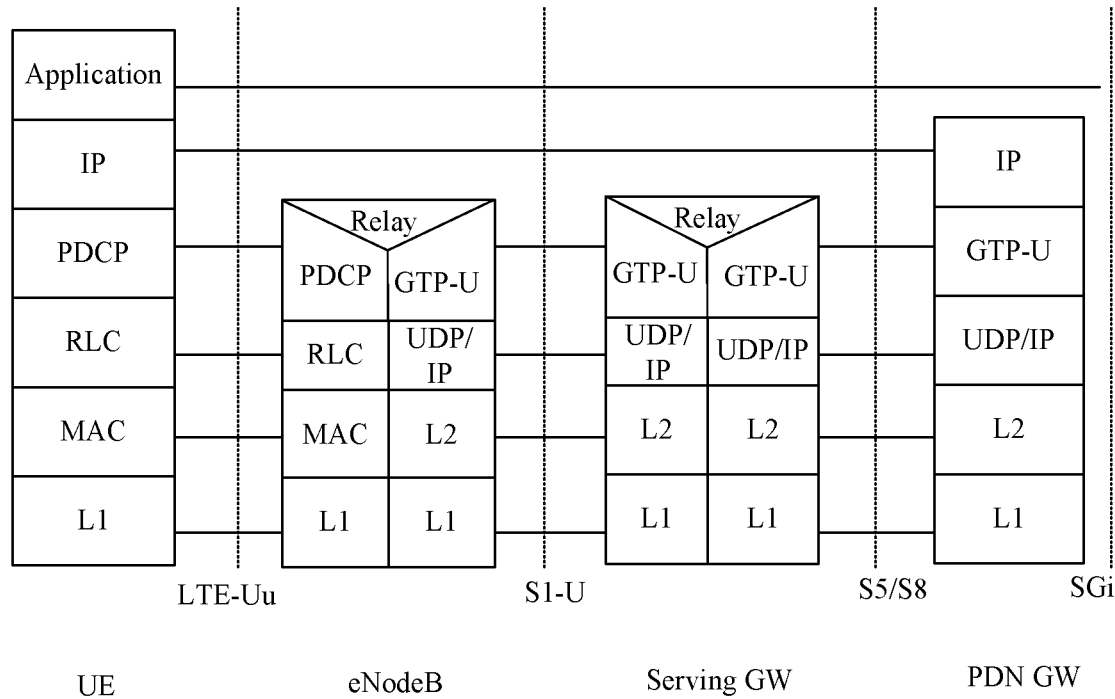
FIG. 1 is a schematic diagram of a protocol stack architecture of 4G LTE in the prior art.
Figure 2:
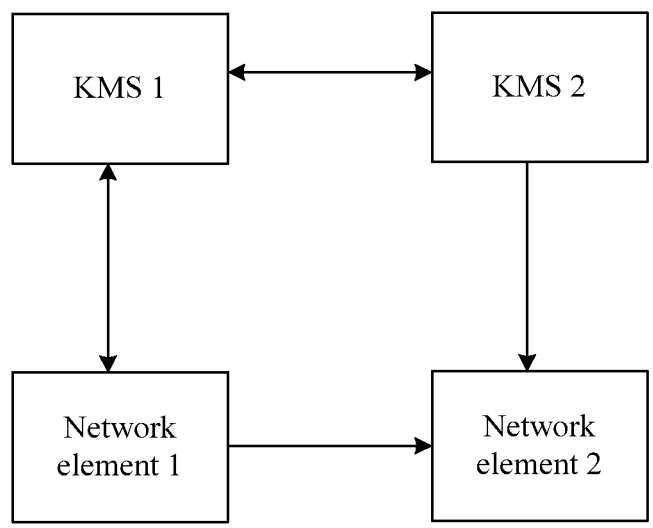
FIG. 2 is a schematic diagram of a structure of one embodiment of a communications system according to the present invention.

To easily understand the embodiments of the present invention, a communications system used in description of the embodiments of the present invention is first described herein. As shown in FIG. 2, FIG. 2 is a schematic diagram of a structure of one embodiment of a communications system according to the embodiments of the present invention. The communications system includes a key management center (KMS) 1, a network element 1, a KMS 2, and a network element 2. The network element 1 and network element 2 each may be any one of UE, a base station, a server, or a gateway, or may be another device that needs to perform encryption and/or integrity protection on data during data transmission. This is not limited herein. The KMS 1 and the KMS 2 may belong to a same operator or different operators, or may both be devices in the Internet. This is not limited herein.

In embodiments of the present invention, when the network element 1 sends communication data to the network element 2, the network element 1 uses a service key or a key derived from the service key to protect the communication data before sending the communication data to the network element 2. Protection on the communication data includes communication data encryption and/or integrity protection by means of the service key or the key derived from the service key. The network element 2 restores the received communication data according to the service key or the key derived from the service key. Therefore, before the network element 1 sends the communication data, the network element 1 and the network element 2 need to obtain the service key from the KMS.

Figure 3:
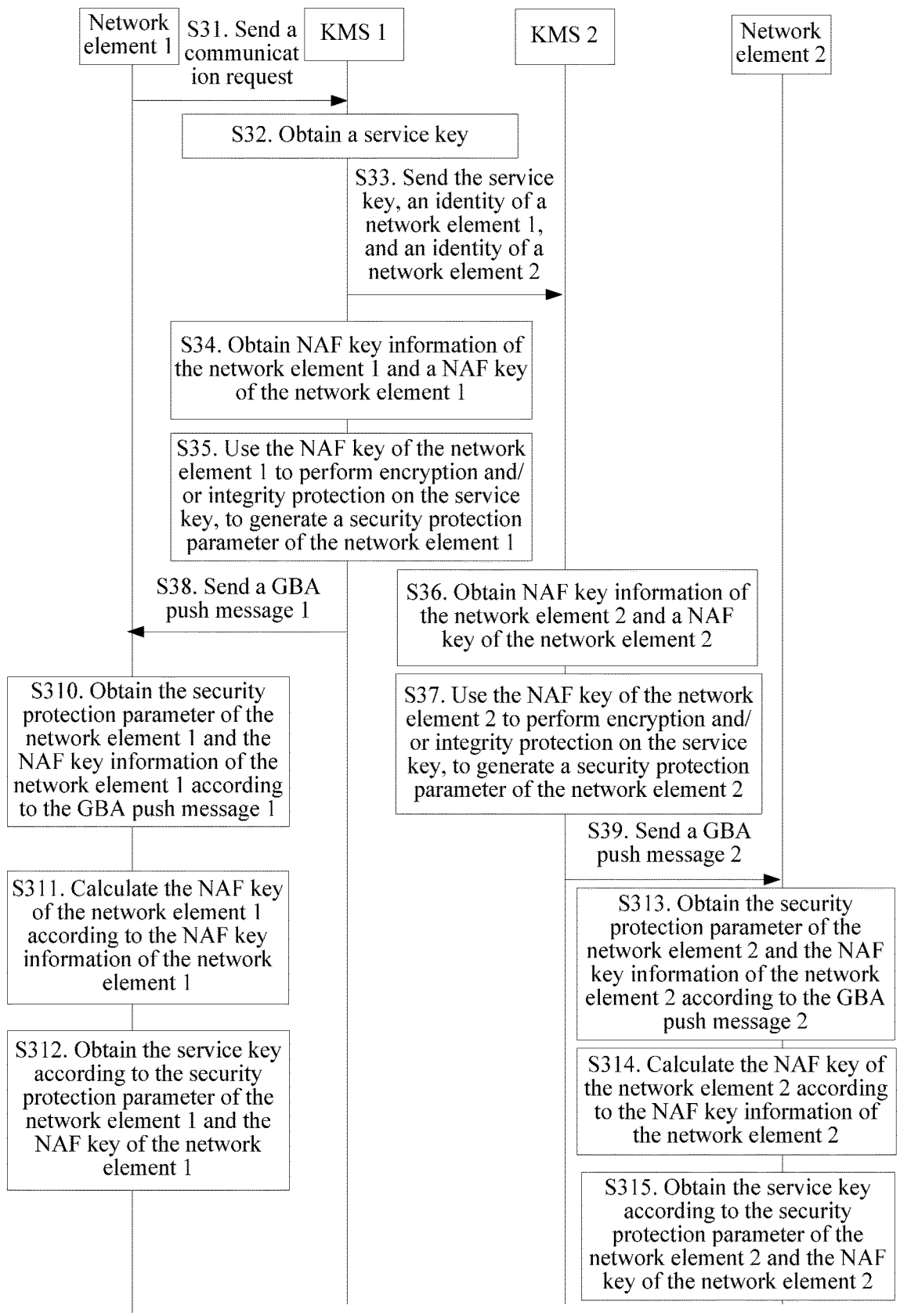
FIG. 3 is a schematic flowchart of one embodiment of a key distribution procedure of the communications system shown in FIG. 2.

Referring to FIG. 3. FIG. 3 is a schematic flowchart of one embodiment of a key distribution procedure of the communications system shown in FIG. 2. As shown in FIG. 3, the key distribution procedure in this embodiment includes the following steps.

S31. The network element 1 sends a communication request to the KMS 1.

In this embodiment, the communication request is used to apply for the service key for data communication between the network element 1 and the network element 2. The network element 1 is a data sender and the network element 2 is a data receiver. The communication request includes an identity of the network element 1 and an identity of the network element 2. For ease of description, the identity mentioned in this specification may include at least one of an IMSI, a globally unique temporary identity GUTI, an IMPI, a TMSI, an TMPI, an IMPU, a service ID, a session ID, a network ID, a link ID, an App ID, or a gateway ID. When a network element is a server, an identity of the network element may further include a server ID.

S32. The KMS 1 obtains a service key.

After receiving the communication request from the network element 1, the KMS 1 obtains the service key.

The service key may be applied to, but not limited to, the following two cases: (1) The network element 1 and the network element 2 separately receive a service key K, and use a same method to generate a service key according to the service key K. The network element 1 uses the service key to protect the communication data between the network element 1 and the network element 2. The network element 2 uses the service key to restore the received communication data. (2) After receiving the service key K, the network element 1 directly uses the service key K to protect the communication data between the network element 1 and the network element 2. The network element 2 directly uses the service key K to restore the received communication data.

The following uses an example to describe a method of obtaining the service key by the KMS 1.

If the service key is applied to the case (1), the method of obtaining the service key K includes obtaining a first parameter set and a second parameter set, where the service key K includes the first parameter set and the second parameter set.

The first parameter set includes at least one of a random number determined by the KMS 1, a random number determined by the KMS 2, an application server NAF key of the network element 1 (for details, refer to step S32), or a NAF key of the network element 2 (for details, refer to step S32). The second parameter set includes at least one of an identity, time indicating a validity period of the service key K, or a serial number.

Specifically, the network element 1 and the network element 2 each store a preset key derivation function. After receiving the first parameter set and the second parameter set, the network element 1 and the network element 2 separately derive the key from the service key K according to the preset key derivation function. Certainly, the network element 1 and the network element 2 may use another method to derive the key from the service key K. This is not limited herein.

If the service key is applied to the case (2), the method of obtaining the service key K is exemplified as follows.

Example 1

The KMS 1 selects a random number. The service key K is the random number.

Example 2

The KMS 1 obtains a first parameter set and a second parameter set, and calculates a dependent variable of a preset key derivation function when the first parameter set and the second parameter set are independent variables of the preset key derivation function. The service key K is the dependent variable.

The first parameter set includes at least one of a NAF key of the network element 1 or the random number determined by the KMS 1. The second parameter set includes at least one of an identity, time indicating a validity period of the service key K, or a serial number.

For example, K=KDF (key, ID), or K=KDF (key, time), or K=KDF (key, ID, time), or K=KDF (key, SN), or K=KDF (key, ID, SN), where K is the service key; KDF 0 is the key derivation function; key includes at least one of the NAF key of the network element 1 or the random number determined by the KMS 1; SN is a serial number of communication between the network element 1 and the network element 2, or a serial number of communication between the network element 1 and the KMS 1; time is a validity period of the service key; ID is an identity.

In this embodiment, when the first parameter set includes the NAF key of the network element 1, the step S32 is performed after the step S34. When the first parameter set does not include the NAF key of the network element 1, the step S32 and the step S34 are not subject to a specific sequence and may be performed at the same time or in sequence. This is not limited herein.

Example 3

The KMS 1 negotiates the service key K with the KMS 2.

There are many methods of negotiating the service key K by the KMS 1 and the KMS 2. The following uses examples to describe the methods.

Example (1)

The KMS 2 obtains a second random number and/or a NAF key of the network element 2, and sends the second random number and/or the NAF key of the network element 2 to the KMS 1. The KMS 1 receives the second random number and/or the NAF key of the network element 2 sent by the KMS 2.

The KMS 1 calculates a dependent variable of the preset key derivation function when at least one of the identity, the time indicating a validity period of the service key, the serial number, the random number determined by the KMS 1, or the NAF key of the network element 1 and the second random number and/or the NAF key of the network element 2 are independent variables of the preset key derivation function. The service key is the dependent variable.

For example, K=KDF (key, ID), or K=KDF (key, time), or K=KDF (key, SN), or K=KDF (key1, key2), where key and key2 each include the second random number and/or the NAF key of the network element 2; ID is an identity set; time is a validity period of the service key; SN is a serial number of communication between the network element 1 and the network element 2, or a serial number of communication between the network element 1 and the KMS 1, or a serial number of communication between the network element 2 and the KMS 2; key1 includes the random number determined by the KMS 1 and/or the NAF key of the network element 1.

Example (2)

The KMS 1 selects a random number, which is referred to as a first random number. The KMS 1 sends the first random number and/or the NAF key of the network element 1 to the KMS 2. The KMS 2 obtains the service key according to the first random number and/or the NAF key of the network element 1. For details about a method of obtaining the service key by the KMS 2, refer to the method of obtaining the service key by the KMS 1 in the example 1. Details are not described again.

Example (3)

The KMS 1 and the KMS 2 negotiate the service key by using a DH key negotiation method.

The DH key negotiation method is the prior art and is not described herein.

Example (4)

The KMS 1 and the KMS 2 obtain a negotiation parameter by using a DH key negotiation method. The KSM 1 calculates a dependent variable of a preset key derivation function when the negotiation parameter is one of independent variables of the preset key derivation function. The service key includes the dependent variable.

The preset key derivation function is set on the KMS 1. When obtaining the independent variables of the preset key derivation function, the KMS 1 uses the negotiation parameter obtained by using the DH key negotiation method as one of independent variables. Other independent variables of the preset key derivation function are not limited. For example, other independent variables may be random numbers determined by the KMS 1.

The KMS 1 determines all the independent variables of the preset key derivation function, and calculates the dependent variable of the preset key derivation function. The service key includes the dependent variable.

In this embodiment, when the first parameter set includes the NAF key of the network element 1, the step S32 is performed after the step S34. When the first parameter set does not include the NAF key of the network element 1, the step S32 and the step S34 are not subject to a specific sequence and may be performed at the same time or in sequence. This is not limited herein.

S33. The KMS 1 sends the service key, an identity of the network element 1, and an identity of the network element 2 to the KMS 2.

It should be noted that the step S33 and steps S34 and S35 are not subject to a definite sequence.

S34. The KMS 1 obtains NAF key information of the network element 1 and a NAF key of the network element 1.

After receiving the communication request from the network element 1, the KMS 1 determines whether both the identity of the network element 1 and the identity of the network element 2 included in the communication request include a preset parameter.

If both the identity of the network element 1 and the identity of the network element 2 include the preset parameters, the KMS 1 generates a first GPI request.

If the identity of the network element 1 includes the preset parameter, but the identity of the network element 2 does not include the preset parameter, the KMS 1 returns an error indication to the network element 1. The error indication includes the identity of the network element 2. The network element 1 receives the error indication from the KMS 1 and sends the identity of the network element 1 and the preset parameter of the network element 2 to the KMS 1. The KMS 1 generates a first GPI request according to the identity of the network element 1 and the preset parameter of the network element 2.

If the identity of the network element 2 includes the preset parameter, but the identity of the network element 1 does not include the preset parameter, the KMS 1 returns an error indication to the network element 1. The error indication includes the identity of the network element 1. The network element 1 receives the error indication from the KMS 1 and sends the preset parameter of the network element 1 and the identity of the network element 2 to the KMS 1. The KMS 1 generates a first GPI request according to the preset parameter of the network element 1 and the identity of the network element 2.

Alternatively, if at least one of the identity of the network element 1 and the identity of the network element 2 does not include the preset parameter, the KMS 1 returns an error indication to the network element 1. The network element 1 receives the error indication and sends the preset parameter of the network element 1 and the preset parameter of the network element 2 to the KMS 1. The KMS 1 generates a first GPI request according to the preset parameter of the network element 1 and the preset parameter of the network element 2.

The preset parameter may be an IMPI, an IMSI, or another parameter. This is not limited herein.

In this embodiment, a method of generating the GPI request is the prior art. Details are not described herein.

After sending the first GPI request to a first BSF, the KMS 1 receives GPI 1 and the NAF key of the network element 1 that are sent by the first BSF. The GPI 1 carries the NAF key information of the network element 1. The NAF key information of the network element 1 is information required to obtain the NAF key of the network element 1. In this embodiment, a method of obtaining the GPI 1 and the NAF key of the network element 1 by the first BSF is the prior art. Details are not described herein.

S35. The KMS 1 uses the NAF key of the network element 1 to perform encryption and/or integrity protection on the service key, to generate a security protection parameter of the network element 1.

The KMS 1 may use an encryption algorithm, such as an AES encryption algorithm, to perform encryption, and may use an integrity protection algorithm, such as an HMAC algorithm, to perform integrity protection. This is not limited herein.

S36. The KMS 2 obtains NAF key information of the network element 2 and a NAF key of the network element 2.

After receiving the identity of the network element 1 and the identity of the network element 2 that are sent by the KMS 1, the KMS 2 generates a second GPI request. For details about a method of generating the second GPI request by the KMS 2, refer to the method of generating the first GPI request by the KMS 1 in the step S34. Details are not described again.

After sending the second GPI request to a second BSF, the KMS 2 receives GPI 2 and the NAF key of the network element 2 that are sent by the second BSF. The GPI 2 carries the NAF key information of the network element 2. The NAF key information of the network element 2 is information required to obtain the NAF key of the network element 2. In this embodiment, a method of obtaining the GPI 2, the NAF key of the network element 2, and the NAF key information of the network element 2 by the second BSF is the prior art. Details are not described herein.

It should be noted that the first BSF and the second BSF may be a same BSF or different BSFs. This is not limited herein.

S37. The KMS 2 uses the NAF key of the network element 2 to perform encryption and/or integrity protection on the service key, to generate a security protection parameter of the network element 2.

For details, refer to descriptions in the step S35. Details are not described again.

It should be noted that the steps S36 and S37, the steps S34 and S35, steps S310 and S311, and step S314 are not subject to a definite sequence.

S38. The KMS 1 sends a GBA push message 1 to the network element 1.

The GBA push message 1 carries the security protection parameter of the network element 1 and the NAF key information of the network element 1.

In this embodiment, there are two methods of sending the GBA push message 1 by the KMS 1. Method 1: The KMS 1 first sends the GPI 1 to the network element 1, and then sends the push message to the network element 1. The GPI 1 carries the NAF key information of the network element 1 and the push message carries the security protection parameter of the network element 1.

Method 2: The KMS 1 sends a first GPL message to the network element 1. The first GPL message carries both the GPI 1 and the security protection parameter of the network element 1.

Optionally, in this embodiment, the GBA push message 1 further carries the identity of the network element 1, so that the network element 1 determines that the GBA push message 1 is sent to the network element 1. Specifically, in the foregoing first method of sending the GBA push message 1, the identity of the network element 1 is carried in the GPI 1 and sent to the network element 1. In the foregoing second method of sending the GBA push message 1, the identity of the network element 1 is carried in the first GPL message and sent to the network element 1.

Further, optionally, in the foregoing second method of sending the GBA push message 1, the first GPL message further carries length information of the identity of the network element 1. Certainly, if the identity of the network element 1 has a fixed length, the first GPL message may not carry the length information of the identity of the network element 1.

S39. The KMS 2 sends a GBA push message 2 to the network element 2.

The GBA push message 2 carries the security protection parameter of the network element 2 and the NAF key information of the network element 2.

For details about a method of sending the GBA push message 2 by the KMS 2, refer to the method of sending the GBA push message 1 by the KMS 1 in the step S38. Details are not described again.

S310. The network element 1 obtains the security protection parameter of the network element 1 and the NAF key information of the network element 1 according to the GBA push message 1.

If the GBA push message 1 includes the GPI 1 and the push message, after receiving the GPI 1, the network element 1 obtains the NAF key information of the network element 1 according to the GPI 1 and the identity of the network element 1. The network element 1 receives the push message and obtains the security protection parameter of the network element 1 from the push message.

If the GBA push message 1 includes the first GPL message, the network element 1 receives the first GPL message and obtains the NAF key information of the network element 1 and the security protection parameter of the network element 1 from the GPL message.

S311. The network element 1 calculates the NAF key of the network element 1 according to the NAF key information of the network element 1.

In this embodiment, the NAF key information of the network element 1 and the method of calculating the NAF key of the network element 1 by the network element 1 are the prior art. Details are not described herein.

S312. The network element 1 obtains the service key according to the security protection parameter of the network element 1 and the NAF key of the network element 1.

Since the security protection parameter of the network element 1 is obtained after encryption and/or integrity protection are/is performed on the service key by using the NAF key of the network element 1, the network element 1 may restore the service key according to the security protection parameter of the network element 1 and the NAF key of the network element 1.

S313. The network element 2 obtains the security protection parameter of the network element 2 and the NAF key information of the network element 2 according to the GBA push message 2.

For details, refer to descriptions in the step S310. Details are not described again.

S314. The network element 2 calculates the NAF key of the network element 2 according to the NAF key information of the network element 2.

In this embodiment, the NAF key information of the network element 2 and the method of calculating the NAF key of the network element 2 by the network element 2 are the prior art. Details are not described herein.

S315. The network element 2 obtains the service key according to the security protection parameter of the network element 2 and the NAF key of the network element 2.

For details, refer to descriptions in the step S312. Details are not described again.

In embodiments of the present invention, after separately obtaining the service key, the network element 1 and the network element 2 have many methods to use the service key.

For example, the network element 1 uses the service key to protection first communication data, and generates and sends second communication data to the network element 2. Specifically, the network element 1 may directly use the service key to perform encryption and/or integrity protection on the first communication data, to generate the second communication data. Alternatively, the network element 1 uses the service key K to generate the service key by using a preset method, uses the service key to perform encryption and/or integrity protection on the first communication data, to generate the second communication data, and sends the second communication data to the network element 2.

The network element 2 receives the second communication data and restores the first communication data according to the service key. Specifically, if the network element 1 uses the service key to perform encryption and/or integrity protection on the first communication data to generate the second communication data, the network element 2 directly uses the service key to restore the first communication data from the second communication data. If the network element 1 uses the service key K to perform encryption and/or integrity protection on the first communication data to generate the second communication data, the network element 2 directly uses the service key K and the same preset method as that of the network element 1 to generate the service key, and uses the service key to restore the first communication data from the second communication data.

Certainly, the network element 1 and the network element 2 may use another method to use the service key. This is not limited herein.

One embodiment of the key distribution procedure is described above with reference to FIG. 3. In this embodiment, the KMS 1 sends the GBA push message 1 to the network element 1 and the KMS 2 sends the GBA push message 2 to the network element 2.

Optionally, in some possible implementations of embodiments of the present invention, the KMS 2 sends the GBA push message 2 to the KMS 1. When the KMS 1 sends the GBA push message 1 to the network element 1, the GBA push message 1 further carries the GBA push message 2. In this way, the KMS 2 does not need to send the GBA push message 2 to the network element 2. Instead, the network element 1 receives the GBA push message 1, obtains the GBA push message 2 from the GBA push message 1, and sends the GBA push message 2 to the network element 2.

Optionally, in some possible implementations of embodiments of the present invention, the KMS 2 sends the GBA push message 2 to the KMS 1. The KMS 1 sends the GBA push message 1 and the GBA push message 2 to the network element 1, that is, the GBA message 2 is not included in the GBA message 1. After receiving the GBA push message 1 and the GBA push message 2, the network element 1 sends the GBA push message 2 to the network element 2.

Optionally, in some possible implementations of embodiments of the present invention, the KMS 2 sends the GBA push message 2 to the KMS 1, and the KMS 1 sends the GBA push message 1 and the GBA push message 2 to the network element 1 and the network element 2 respectively.

Optionally, in some possible implementations of embodiments of the present invention, the KMS 1 sends the GBA push message 1 to the KMS 2. When the KMS 2 sends the GBA push message 2 to the network element 2, the GBA push message 2 further carries the GBA push message 1. In this way, the KMS 1 does not need to send the GBA push message 1 to the network element 1. Instead, the network element 2 receives the GBA push message 2, obtains the GBA push message 1 from the GBA message 2, and sends the GBA push message 1 to the network element 1.

Optionally, in some possible implementations of embodiments of the present invention, the KMS 1 sends the GBA push message 1 to the KMS 2. The KMS 2 sends the GBA push message 1 and the GBA push message 2 to the network element 2, that is, the GBA message 1 is not included in the GBA message 2. After receiving the GBA push message 1 and the GBA push message 2, the network element 2 sends the GBA push message 1 to the network element 1.

Optionally, in some possible implementations of embodiments of the present invention, the KMS 1 sends the GBA push message 1 to the KMS 2, and the KMS 2 sends the GBA push message 1 and the GBA push message 2 to the network element 1 and the network element 2 respectively.

In the foregoing possible implementations, if one GBA push message carrying another GBA push message is sent to one network element, or two GBA push messages are sent to a same network element, each GBA push message further carries an identity of a network element to which the GBA push message is sent, so that the network element that receives the two GBA push messages can determine the GBA push message destined to the network element from the two GBA push messages, and forwards the other GBA push message to a network element corresponding to an identity included in the other GBA push message. Specifically, the identity is added to GPI or a GPL message. In addition, when the identity is added to the GPL message, a length identifier that indicates length information of the identity may also be added.

After the step S31 in this embodiment, that is, after the KMS 1 receives the communication request from the network element 1, the step S32 and the procedure after the step S32 are performed. Optionally, in some possible implementations of embodiments of the present invention, a service server sends a communication request to the KMS 1 in the step S31. The communication request is used to apply for data communication between the network element 1 and the network element 2 and apply for the service key for data communication between the network element 1 and the network element 2. The communication request includes the identity of the network element 1 and the identity of the network element 2.

Optionally, in some possible implementations of embodiments of the present invention, the KMS 1 stores the identity of the network element 1 and the identity of the network element 2. The KMS 1 actively initiates the step S32 and the procedure after the step S32 according to a service requirement or another requirement, that is, the step S31 is not required.

Optionally, in some possible implementations of embodiments of the present invention, the GBA push message 1 and the GBA push message 2 each include identity information of the service key. The identity information includes at least one of the time indicating a validity period of the service key, the identity of the network element 1, the identity of the network element 2, or a service ID. The service ID is used to indicate a service corresponding to the service ID when the service key is applied to the service.

Figure 4:
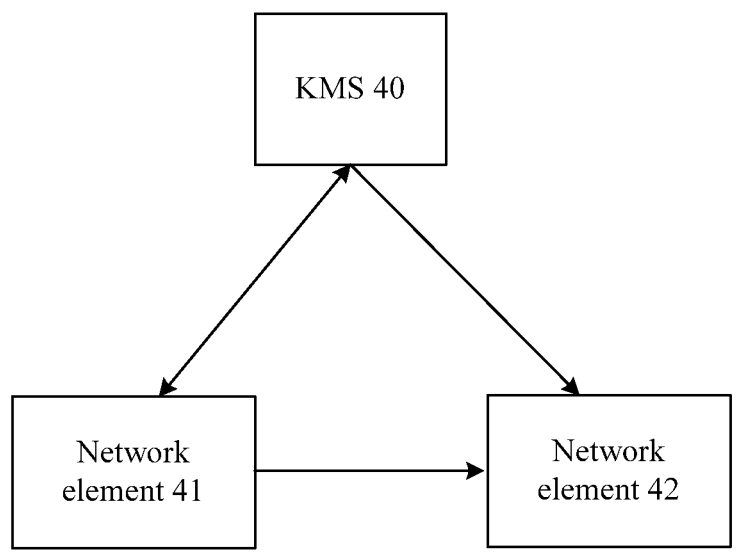
FIG. 4 is a schematic diagram of a structure of another embodiment of a communications system according to the present invention.

As shown in FIG. 4, FIG. 4 is a schematic diagram of a structure of another embodiment of a communications system according to the embodiments of the present invention. The communications system includes a KMS 40, a network element 41, and a network element 42. The network element 41 and network element 42 each may be any one of UE, a base station, a server, or a gateway, or may be another device that needs to perform encryption and/or integrity protection on data during data transmission. This is not limited herein.

Figure 5:
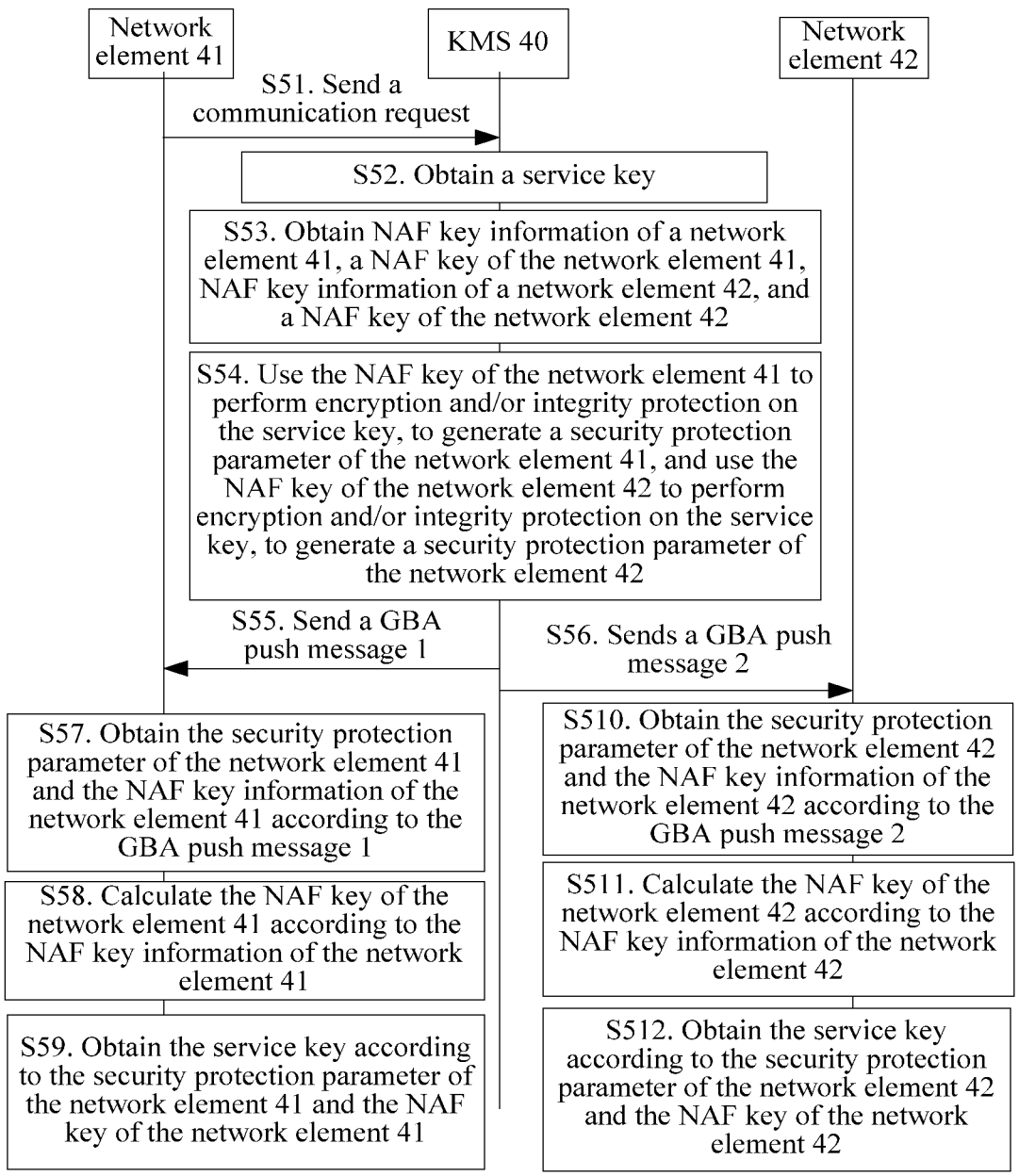
FIG. 5 is a schematic flowchart of one embodiment of a key distribution procedure of the communications system shown in FIG. 4.

Referring to FIG. 5. FIG. 5 is a schematic flowchart of one embodiment of a key distribution procedure of the communications system shown in FIG. 4.

As shown in FIG. 5, the key distribution procedure in this embodiment includes the following steps.

S51. The network element 41 sends a communication request to the KMS 40.

For details, refer to descriptions in the step S31 in the embodiment shown in FIG. 3. Details are not described again.

S52. The KMS 40 obtains a service key.

For details, refer to descriptions in the step S32 in the embodiment shown in FIG. 3. Details are not described again.

S53. The KMS 40 obtains NAF key information of the network element 41, a NAF key of the network element 41, NAF key information of the network element 42, and a NAF key of the network element 42.

For details about the method of obtaining the NAF key information of the network element 41 and the NAF key of the network element 41 by the KMS 40, refer to descriptions in the step S33 in the embodiment shown in FIG. 3. Details are not described again.

For details about the method of obtaining the NAF key information of the network element 42 and the NAF key of the network element 42 by the KMS 40, refer to descriptions in the step S36 in the embodiment shown in FIG. 3. Details are not described again.

S54. The KMS 40 uses the NAF key of the network element 41 to perform encryption and/or integrity protection on the service key, to generate a security protection parameter of the network element 41, and uses the NAF key of the network element 42 to perform encryption and/or integrity protection on the service key, to generate a security protection parameter of the network element 42.

For details, refer to descriptions in the steps S34 and S35 in the embodiment shown in FIG. 3. Details are not described again.

S55. The KMS 40 sends a GBA push message 1 to the network element 41.

For details, refer to descriptions in the step S38 in the embodiment shown in FIG. 3. Details are not described again.

S56. The KMS 40 sends a GBA push message 2 to the network element 42.

For details, refer to descriptions in the step S39 in the embodiment shown in FIG. 3. Details are not described again.

It should be noted that the step S55 and the step S56 are not subject to a definite sequence.

S57. The network element 41 obtains the security protection parameter of the network element 41 and the NAF key information of the network element 41 according to the GBA push message 1.

S58. The network element 41 calculates the NAF key of the network element 41 according to the NAF key information of the network element 41.

S59. The network element 41 obtains the service key according to the security protection parameter of the network element 41 and the NAF key of the network element 41.

S510. The network element 42 obtains the security protection parameter of the network element 42 and the NAF key information of the network element 42 according to the GBA push message 2.

S511. The network element 42 calculates the NAF key of the network element 42 according to the NAF key information of the network element 42.

S512. The network element 42 obtains the service key according to the security protection parameter of the network element 42 and the NAF key of the network element 42.

It should be noted that the steps S57 and S59 and the steps S510 and S512 are not subject to a definite sequence.

For details about the steps S57-S512, refer to descriptions in the steps S310-S315 in the embodiment shown in FIG. 3. Details are not described again.

Another embodiment of the key distribution procedure is described above with reference to FIG. 5. In this embodiment, the KMS 40 sends the GBA push message 1 to the network element 41 and sends the GBA push message 2 to the network element 42.

During actual application, when the KMS 40 sends the GBA push message 1 to the network element 41, the GBA push message 1 may further carries the GBA push message 2. In this way, the KMS 40 does not need to send the GBA push message 2 to the network element 42. Instead, the network element 41 receives the GBA push message 1, obtains the GBA push message 2 from the GBA message 1, and sends the GBA push message 2 to the network element 42.

Alternatively, the KMS 40 sends the GBA push message 1 and the GBA push message 2 to the network element 41, that is, the GBA message 2 is not included in the GBA message 1. After receiving the GBA push message 1 and the GBA push message 2, the network element 41 sends the GBA push message 2 to the network element 42.

Alternatively, when the KMS 40 sends the GBA push message 2 to the network element 42, the GBA push message 2 may further carries the GBA push message 1. In this way, the KMS 40 does not need to send the GBA push message 1 to the network element 41. Instead, the network element 42 receives the GBA push message 2, obtains the GBA push message 1 from the GBA message 2, and sends the GBA push message 1 to the network element 41.

Alternatively, the KMS 40 sends the GBA push message 1 and the GBA push message 2 to the network element 42, that is, the GBA message 1 is not included in the GBA message 2. After receiving the GBA push message 1 and the GBA push message 2, the network element 42 sends the GBA push message 1 to the network element 41.

In the foregoing possible implementations, if one GBA push message carrying another GBA push message is sent to one network element, or two GBA push messages are sent to a same network element, each GBA push message further carries an identity of a network element to which the GBA push message is sent, so that the network element that receives the two GBA push messages can determine the GBA push message destined to the network element from the two GBA push messages, and forwards the other GBA push message to a network element corresponding to an identity included in the other GBA push message. Specifically, the identity is added to GPI or a GPL message. In addition, when the identity is added to the GPL message, a length identifier that indicates length information of the identity may also be added.

After the step S51 in this embodiment, that is, after the KMS 40 receives the communication request from the network element 41, the step S52 and the procedure after the step S52 are performed. During actual application, a service server sends a communication request to the KMS 40 in the step S51. The communication request is used to apply for data communication between the network element 41 and the network element 42 and apply for the service key for data communication between the network element 41 and the network element 42. The communication request includes an identity of the network element 41 and an identity of the network element 42.

Alternatively, the KMS 40 may store the identity of the network element 41 and the identity of the network element 42. The KMS 40 actively initiates the step S52 and the procedure after the step S52 according to a service requirement or another requirement, that is, the step S51 is not required.

Optionally, in some possible implementations of embodiments of the present invention, the GBA push message 1 and the GBA push message 2 each include identity information of the service key. The identity information includes at least one of time indicating a validity period of the service key, the identity of the network element 41, the identity of the network element 42, or a service ID. The service ID is used to indicate a service corresponding to the service ID when the service key is applied to the service.

Figure 6:
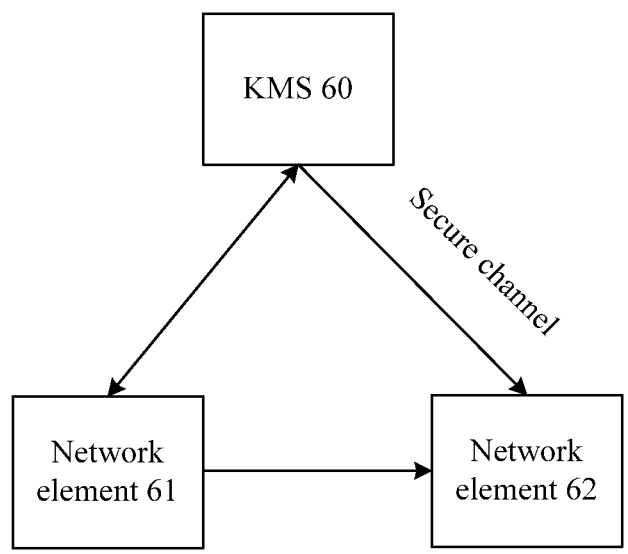
FIG. 6 is a schematic diagram of a structure of another embodiment of a communications system according to the present invention.

As shown in FIG. 6, FIG. 6 is a schematic diagram of a structure of another embodiment of a communications system according to the embodiments of the present invention. The communications system includes a KMS 60, a network element 61, and a network element 62. The network element 61 may be any one of UE, a base station, a server, or a gateway, or may be another device that needs to perform encryption and/or integrity protection on data during data transmission. This is not limited herein. A secure channel is established between the network element 62 and the KMS 60. Specifically, the KMS 60 may belong to a first operator. The network element 62 may be a core network element that belongs to the first operator, for example, a gateway, a server, or a mobility management entity in a core network. Alternatively, the network element 62 may be a network element in the Internet. This is not limited herein.

Figure 7:
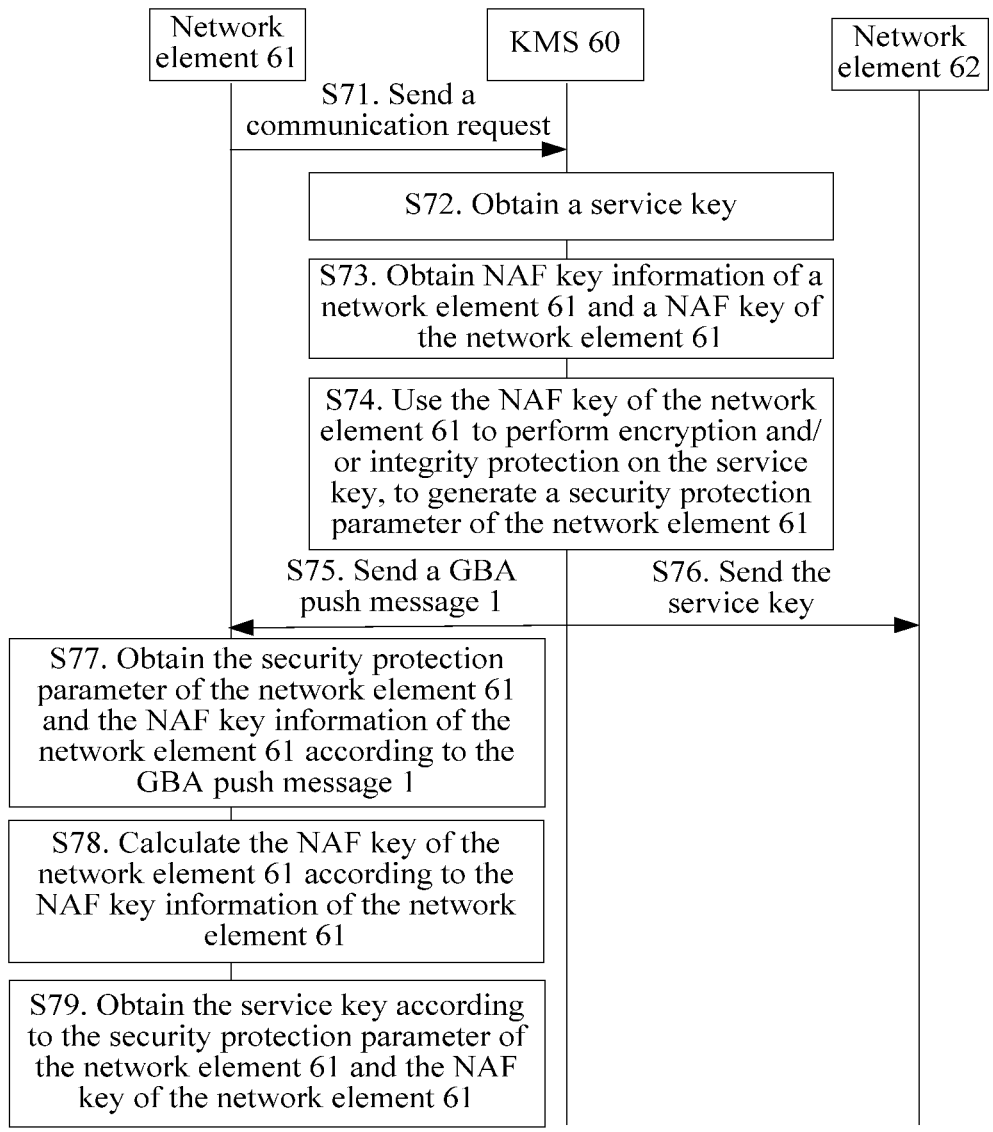
FIG. 7 is a schematic flowchart of one embodiment of a key distribution procedure of the communications system shown in FIG. 6.

Referring to FIG. 7. FIG. 7 is a schematic flowchart of one embodiment of a key distribution procedure of the communications system shown in FIG. 6.

As shown in FIG. 7, the key distribution procedure in this embodiment includes the following steps.

S71. The network element 61 and the network element 62 send a communication request to the KMS 60.

For details, refer to descriptions in the step S31 in the embodiment shown in FIG. 3. Details are not described again. FIG. 7 shows an example in which the network element 61 is a data sender.

S72. The KMS 60 obtains a service key.

For details, refer to descriptions in the step S32 in the embodiment shown in FIG. 3. Details are not described again.

S73. The KMS 60 obtains NAF key information of the network element 61 and a NAF key of the network element 61.

For details, refer to descriptions in the step S33 in the embodiment shown in FIG. 3. Details are not described again.

S74. The KMS 60 uses the NAF key of the network element 61 to perform encryption and/or integrity protection on the service key, to generate a security protection parameter of the network element 61.

For details, refer to descriptions in the step S34 in the embodiment shown in FIG. 3. Details are not described again.

S75. The KMS 60 sends a GBA push message 1 to the network element 61.

For details, refer to descriptions in the step S38 in the embodiment shown in FIG. 3. Details are not described again.

S76. The KMS 60 sends the service key to the network element 62.

In this embodiment, since the secure channel is established between the network element 62 and the KMS 60, the KMS 60 does not need to perform encryption and/or integrity protection on the service key, but directly sends the service key to the network element 62.

It should be noted that the step S75 and the steps S74-S76 are not subject to a definite sequence.

S77. The network element 61 obtains the security protection parameter of the network element 61 and the NAF key information of the network element 61 according to the GBA push message 1.

S78. The network element 61 calculates the NAF key of the network element 61 according to the NAF key information of the network element 61.

S79. The network element 61 obtains the service key according to the security protection parameter of the network element 61 and the NAF key of the network element 61.

After the step S71 in this embodiment, that is, after the KMS 60 receives the communication request from the network element 61, the step S72 and the procedure after the step S72 are performed. During actual application, a service server sends a communication request to the KMS 60 in the step S71. The communication request is used to apply for data communication between the network element 61 and the network element 62 and apply for the service key for data communication between the network element 61 and the network element 62. The communication request includes an identity of the network element 61 and an identity of the network element 62.

Alternatively, the KMS 60 may store the identity of the network element 61 and the identity of the network element 62. The KMS 60 actively initiates the step S72 and the procedure after the step S72 according to a service requirement or another requirement, that is, the step S71 is not required.

Optionally, in some possible implementations of embodiments of the present invention, the GBA push message 1 and the GBA push message 2 each include identity information of the service key. The identity information includes at least one of time indicating a validity period of the service key, the identity of the network element 61, the identity of the network element 62, or a service ID. The service ID is used to indicate a service corresponding to the service ID when the service key is applied to the service.

Optionally, the communications system shown in FIG. 6 may further include a KMS 64. Correspondingly, in the step S72 in the key distribution procedure shown in FIG. 7, the KMS 60 further sends the service key to the KMS 64. In a changed step S77, the KMS 64 sends the service key to the network element 62.

Alternatively, in a changed step S71, the network element 62 sends a communication request to the KMS 64. In a changed step S72, the KMS 64 obtains the service key, and sends the service key to the KMS 60. In a changed step S77, the KMS 64 sends the service key to the network element 62.

With reference to FIG. 2, FIG. 5, and FIG. 7, the three embodiments of the communications system in the present invention and the embodiments of working procedures of the communications system are described. The following describes a key distribution method in embodiments of the present invention.

Figure 8:
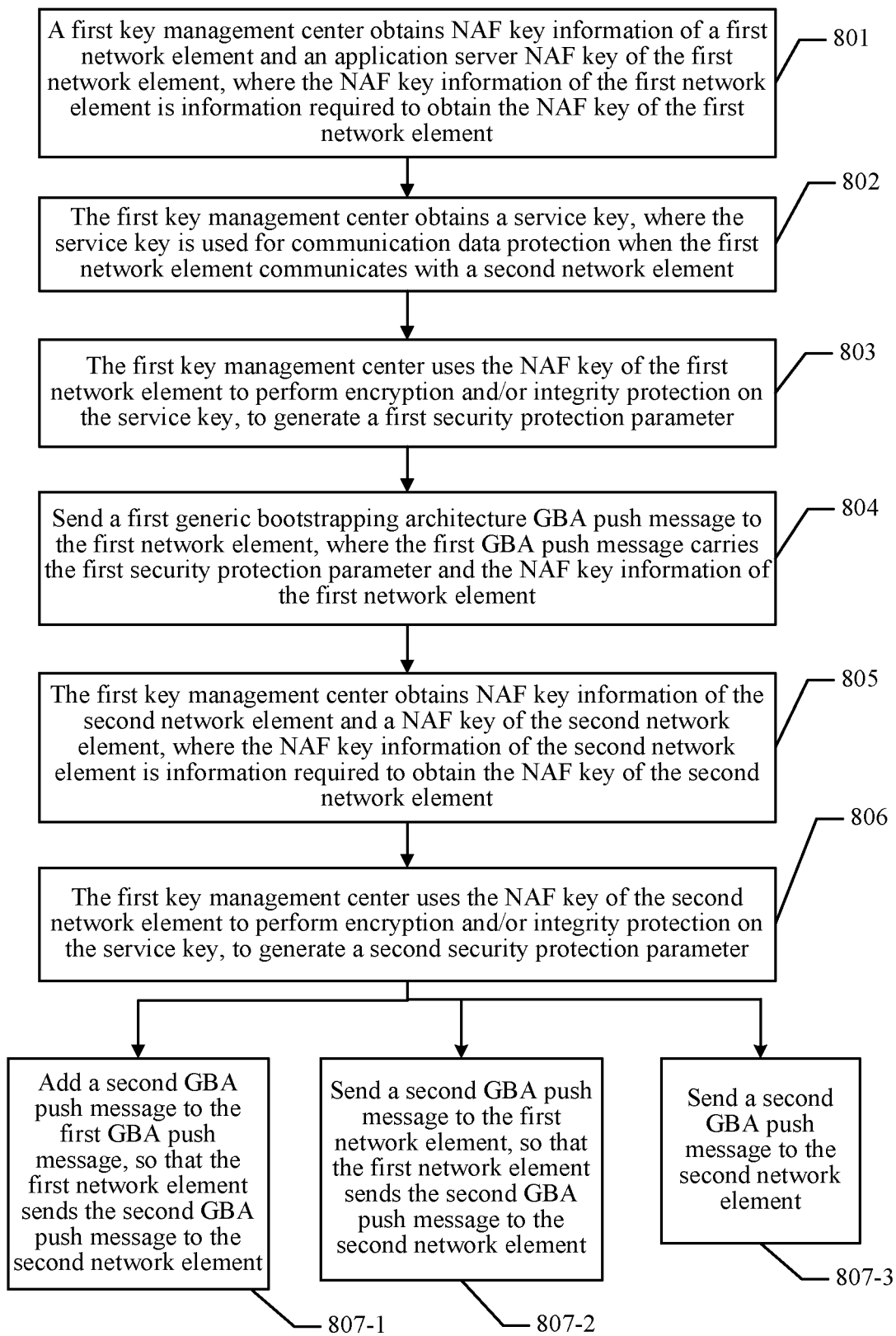
FIG. 8 is a schematic flowchart of one embodiment of a key distribution method according to the present invention.

Referring to FIG. 8. One embodiment of a key distribution method in the present invention includes the following steps.

801. A first key management center obtains NAF key information of a first network element and a NAF key of the first network element, where the NAF key information of the first network element is information required to obtain the NAF key of the first network element.

In this embodiment, the first key management center may be the KMS 1 in the communications system shown in FIG. 2, and the first network element may be the network element 1 in the communications system shown in FIG. 3.

Alternatively, the first key management center may be the KMS 2 in the communications system shown in FIG. 2, and the first network element may be the network element 2 in the communications system shown in FIG. 3.

Alternatively, the first key management center may be the KMS 40 in the communications system shown in FIG. 4, and the first network element may be the network element 41 or the network element 42 in the communications system shown in FIG. 3.

Alternatively, the first key management center may be the KMS 60 in the communications system shown in FIG. 6, and the first network element may be the network element 61 in the communications system shown in FIG. 3. This is not limited herein.

802. The first key management center obtains a service key, where the service key is used for communication data protection when the first network element communicates with a second network element.

803. The first key management center uses the NAF key of the first network element to perform encryption and/or integrity protection on the service key, to generate a first security protection parameter.

804. Send a first generic bootstrapping architecture GBA push message to the first network element, where the first GBA push message carries the first security protection parameter and the NAF key information of the first network element.

In this embodiment, the first key management center sends a service key for communication between network elements to the network elements, so that data can be protected by using the service key when the network elements send the data to each other and data interception and attack in a sending process can be avoided. In addition, the first key management center further uses a NAF key to encrypt the service key, and sends the service key to the network elements by using a GBA message. The GBA message further carries NAF key information, so that the network elements generate the NAF key according to the NAF key information, and use the NAF key to restore the service key from the GBA message. This ensures service key security.

Optionally, on a basis of the embodiment corresponding to FIG. 8, in a first optional embodiment of the key distribution method in the embodiments of the present invention, the method further includes steps 805 and 806, and one of steps 807-1, 807-2, or 807-3.

805. The first key management center obtains NAF key information of the second network element and a NAF key of the second network element, where the NAF key information of the second network element is information required to obtain the NAF key of the second network element.

In this embodiment, the first key management center may be specifically the KMS 40 in the communications system shown in FIG. 4. The first network element may be the network element 41 or the network element 42 in the communications system shown in FIG. 4. The second network element may be the other one.

806. The first key management center uses the NAF key of the second network element to perform encryption and/or integrity protection on the service key, to generate a second security protection parameter.

807-1. Add a second GBA push message to the first GBA push message, so that the first network element sends the second GBA push message to the second network element.

807-2. Send a second GBA push message to the first network element, so that the first network element sends the second GBA push message to the second network element.

807-3. Send a second GBA push message to the second network element.

In the steps 807-1, 807-2, and 807-3, the second GBA push message carries the second security protection parameter and the NAF key information of the second network element.

Figure 9:
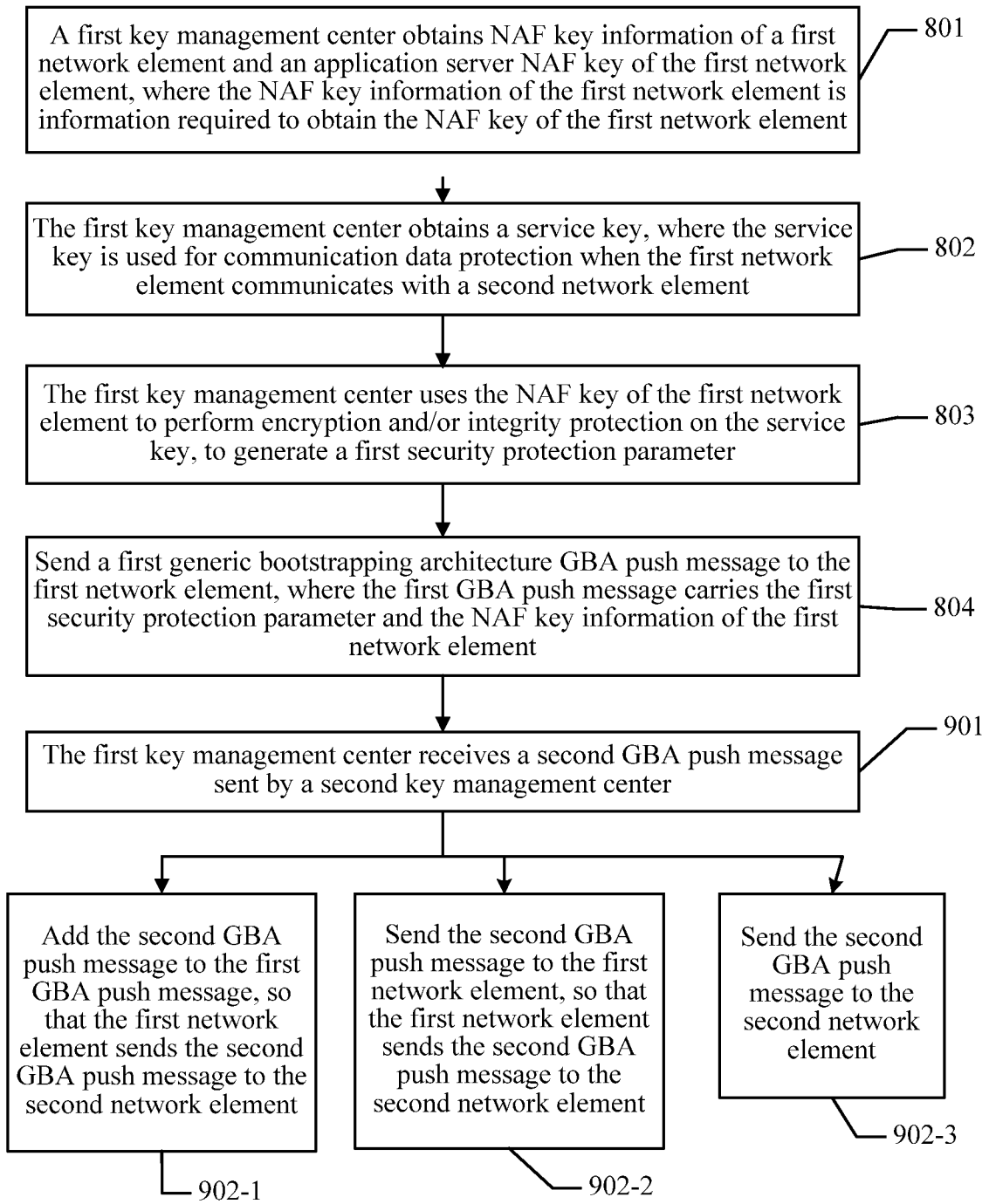
FIG. 9 is a schematic flowchart of another embodiment of a key distribution method according to the present invention.

Optionally, as shown in FIG. 9, on a basis of the embodiment corresponding to the steps 801-804 in FIG. 8, in a second optional embodiment of the key distribution method in the embodiments of the present invention, the method further includes step 901, and one of steps 902-1, 902-2, or 902-3.

901. The first key management center receives a second GBA push message sent by a second key management center.

In this embodiment, the second GBA push message carries a second security protection parameter and NAF key information of the second network element. The second security protection parameter is generated by using a NAF key of the second network element to perform encryption and/or integrity protection on the service key by the second key management center.

In this embodiment, the first key management center may be the KMS 1 in the communications system shown in FIG. 3, the first network element may be the network element 1 in the communications system shown in FIG. 3, the second key management center may be the KMS 2 in the communications system shown in FIG. 3, and the second network element may be the network element 2 in the communications system shown in FIG. 3.

Alternatively, the first key management center may be the KMS 2 in the communications system shown in FIG. 3, the first network element may be the network element 2 in the communications system shown in FIG. 3, the second key management center may be the KMS 1 in the communications system shown in FIG. 3, and the second network element may be the network element 1 in the communications system shown in FIG. 3.

902-1. Add the second GBA push message to the first GBA push message, so that the first network element sends the second GBA push message to the second network element.

902-2. Send the second GBA push message to the first network element, so that the first network element sends the second GBA push message to the second network element.

902-3. Send the second GBA push message to the second network element.

In the steps 902-1, 902-2, and 902-3, the second GBA push message carries the second security protection parameter and the NAF key information of the second network element. The NAF key information of the second network element is information required to obtain the NAF key of the second network element.

Optionally, on a basis of the embodiment corresponding to FIG. 9, in a third optional embodiment of the key distribution method in the embodiments of the present invention, the obtaining a service key in the step S802 includes selecting a random number, where the service key includes the random number; negotiating the service key with the second key management center; receiving the service key sent by the second key management center; or obtaining a first parameter set and a second parameter set, and calculating a dependent variable of a preset key derivation function when the first parameter set and the second parameter set are independent variables of the preset key derivation function, where the service key includes the dependent variable. The first parameter set includes at least one of the random number determined by the first key management center or the NAF key of the first network element. The second parameter set includes at least one of an identity, time indicating a validity period of the service key, or a serial number.

Optionally, on a basis of the third optional embodiment of the key distribution method in the embodiments of the present invention, in a fourth optional embodiment of the key distribution method in the embodiments of the present invention, negotiating the service key with the second key management center includes receiving, a second random number and/or the NAF key of the second network element sent by the second key management center. Negotiating the service key with the second key management center further includes calculating a dependent variable of the preset key derivation function when at least one of the identity, the time indicating a validity period of the service key, the serial number, the random number determined by the first key management center, or the NAF key of the first network element and the second random number and/or the NAF key of the second network element are independent variables of the preset key derivation function, where the service key includes the dependent variable.

Optionally, on a basis of the third optional embodiment of the key distribution method in the embodiments of the present invention, in a fifth optional embodiment of the key distribution method in the embodiments of the present invention, negotiating the service key with the second key management center includes obtaining a first random number; sending the first random number and/or the NAF key of the first network element to the second key management center; and receiving the service key sent by the second key management center, where the service key is determined by the second key management center according to the first random number and/or the NAF key of the first network element.

Optionally, on a basis of the third optional embodiment of the key distribution method in the embodiments of the present invention, in a sixth optional embodiment of the key distribution method in the embodiments of the present invention, negotiating the service key with the second key management center includes negotiating the service key with the second key management center by using a DH key negotiation method.

Optionally, on a basis of the third optional embodiment of the key distribution method in the embodiments of the present invention, in a seventh optional embodiment of the key distribution method in the embodiments of the present invention, negotiating the service key with the second key management center includes obtaining a negotiation parameter by negotiating with the second key management center by means of DH key negotiation; and calculating a dependent variable of the preset key derivation function when the negotiation parameter is one of independent variables of the preset key derivation function, where the service key includes the dependent variable.

Optionally, on a basis of the embodiment corresponding to FIG. 9, in an eighth optional embodiment of the key distribution method in the embodiments of the present invention, obtaining a service key includes obtaining a first parameter set and a second parameter set, where the service key includes the first parameter set and the second parameter set. The first parameter set includes at least one of a random number determined by the first key management center, a random number determined by the second key management center, the NAF key of the first network element, or the NAF key of the second network element. The second parameter set includes at least one of an identity, time indicating a validity period of the service key, or a serial number.

Figure 10:
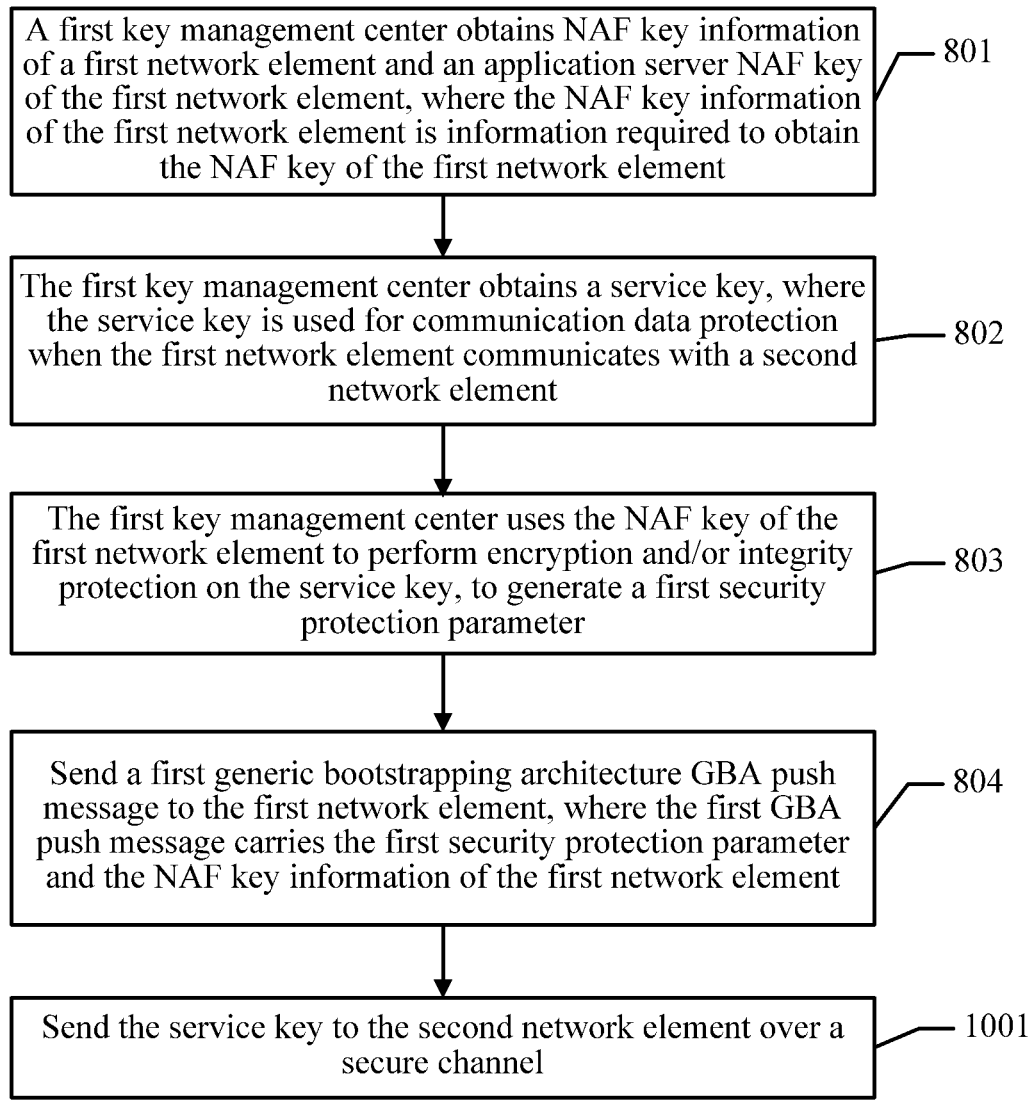
FIG. 10 is a schematic flowchart of another embodiment of a key distribution method according to the present invention.

Optionally, on a basis of the embodiment corresponding to the steps S801-S804 in FIG. 8, as shown in FIG. 10, in a ninth optional embodiment of the key distribution method in the embodiments of the present invention, a secure channel is established between the second network element and the first key management center.

The method further includes the following steps.

1001. Send the service key to the second network element over the secure channel.

In this embodiment, the first key management center may be the KMS 60 in the communications system shown in FIG. 6, and the second network element may be the network element 62 in the communications system shown in FIG. 6.

To better understand details about the embodiment corresponding to the steps S801-S804 in FIG. 8 or optional embodiments, refer to descriptions of the embodiments shown in FIG. 3, FIG. 5, and FIG. 7. Details are not described again.

Figure 11:
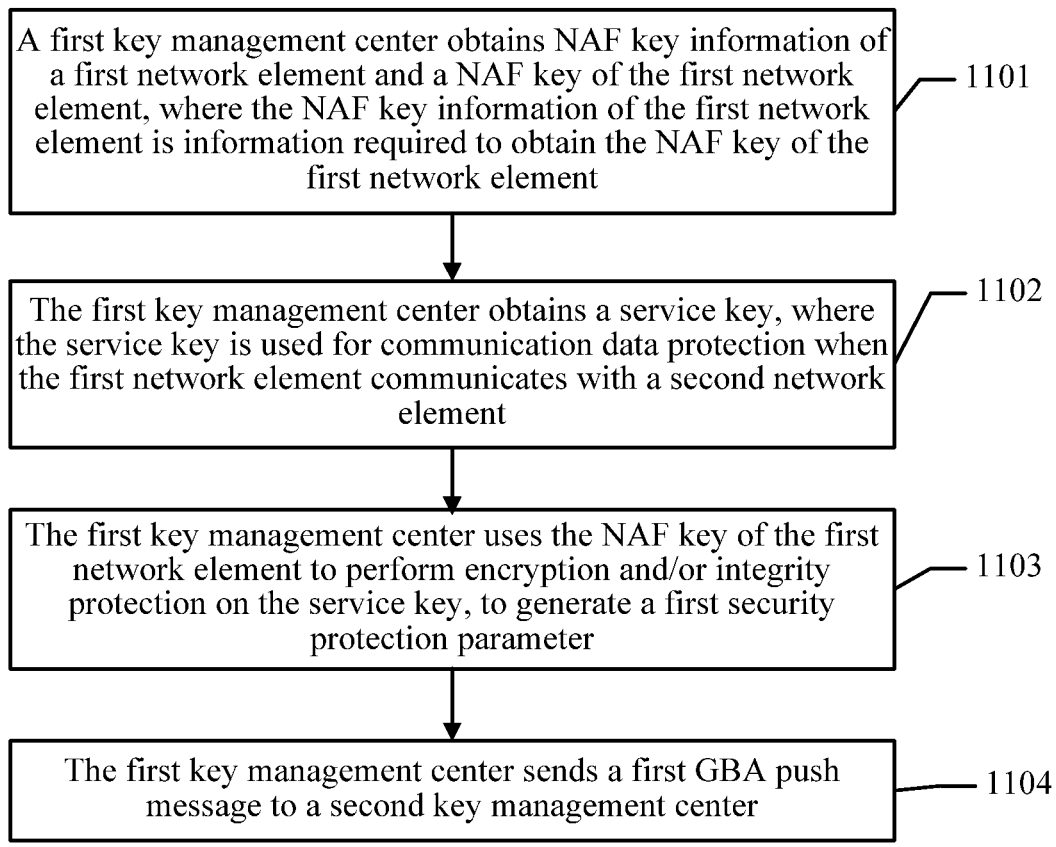
FIG. 11 is a schematic flowchart of another embodiment of a key distribution method according to the present invention.

Referring to FIG. 11. Another embodiment of a key distribution method in the present invention includes the following steps.

1101. A first key management center obtains NAF key information of a first network element and a NAF key of the first network element, where the NAF key information of the first network element is information required to obtain the NAF key of the first network element.

For details, refer to descriptions in the step S801 in the embodiment shown in FIG. 8. Details are not described again.

1102. The first key management center obtains a service key, where the service key is used for communication data protection when the first network element communicates with a second network element.

1103. The first key management center uses the NAF key of the first network element to perform encryption and/or integrity protection on the service key, to generate a first security protection parameter.

1104. The first key management center sends a first GBA push message to a second key management center.

In this embodiment, the first GBA push message carries the first security protection parameter and the NAF key information of the first network element.

The first key management center sends the first GBA push message to the second key management center, and the second key management center sends the first GBA push message to the first network element. Alternatively, the second key management center sends the first GBA push message to the second network element, and the second network element sends the first GBA push message to the first network element.

Optionally, on a basis of the embodiment corresponding to the steps S801-S804 in FIG. 8 or the embodiment corresponding to FIG. 11, in a tenth optional embodiment of the key distribution method in the embodiments of the present invention, obtaining a service key in the step S802 or S1102 includes selecting a random number, where the service key includes the random number. Obtaining a service key in the step S802 or S1102 alternatively includes obtaining a first parameter set and a second parameter set, and calculating a dependent variable of a preset key derivation function when the first parameter set and the second parameter set are independent variables of the preset key derivation function, where the service key includes the dependent variable. Obtaining a service key in the step S802 or S1102 further alternatively includes obtaining the first parameter set and the second parameter set, where the service key includes the first parameter set and the second parameter set.

The first parameter set includes at least one of the random number, the NAF key of the first network element, or the NAF key of the second network element. The second parameter set includes at least one of an identity, time indicating a validity period of the service key, or a serial number.

Optionally, on a basis of the embodiment corresponding to the steps S801-S804 in FIG. 8 or the embodiment corresponding to FIG. 11, in an eleventh optional embodiment of the key distribution method in the embodiments of the present invention, the first GBA push message carries an identity of the first network element.

Optionally, on a basis of the embodiment corresponding to the steps S801-S804 in FIG. 8 or the embodiment corresponding to FIG. 11, in a twelfth optional embodiment of the key distribution method in the embodiments of the present invention, the first GBA push message carries a first GPI message, and the first GPI message carries the identity of the first network element. The first GBA push message alternatively carries a first GPL message, and the first GPL message carries the identity of the first network element, or carries the identity of the first network element and length information of the identity.

Optionally, on a basis of the embodiment corresponding to the steps S801-S804 in FIG. 8 or the embodiment corresponding to FIG. 11, in a thirteenth optional embodiment of the key distribution method in the embodiments of the present invention, the identity includes at least one of an IMSI, a GUTI, an IMPI, a TMSI, a TMPI, an IMPU, a service ID, a session ID, a network ID, a link ID, an App ID, or a gateway ID.

Optionally, on a basis of the embodiment corresponding to the steps S801-S804 in FIG. 8 or the embodiment corresponding to FIG. 11, in a fourteenth optional embodiment of the key distribution method in the embodiments of the present invention, before the step S801 or S1101, the method further includes receiving, by the first key management center, a communication request sent by an initiator, where the communication request is used to apply for a service key for data communication between the first network element and a second network element, the initiator is a data sender in the first network element and the second network element, and the communication request includes an identity of the first network element and an identity of the second network element.

Optionally, on a basis of the embodiment corresponding to the steps S801-S804 in FIG. 8 or the embodiment corresponding to FIG. 11, in a fifteenth optional embodiment of the key distribution method in the embodiments of the present invention, the first GBA push message further carries identity information of the service key.

The identity information includes at least one of time indicating a validity period of the service key, an identity of the first network element, an identity of the second network element, or a service ID. The service ID is used to indicate a service corresponding to the service ID when the service key is applied to the service.

Figure 12:
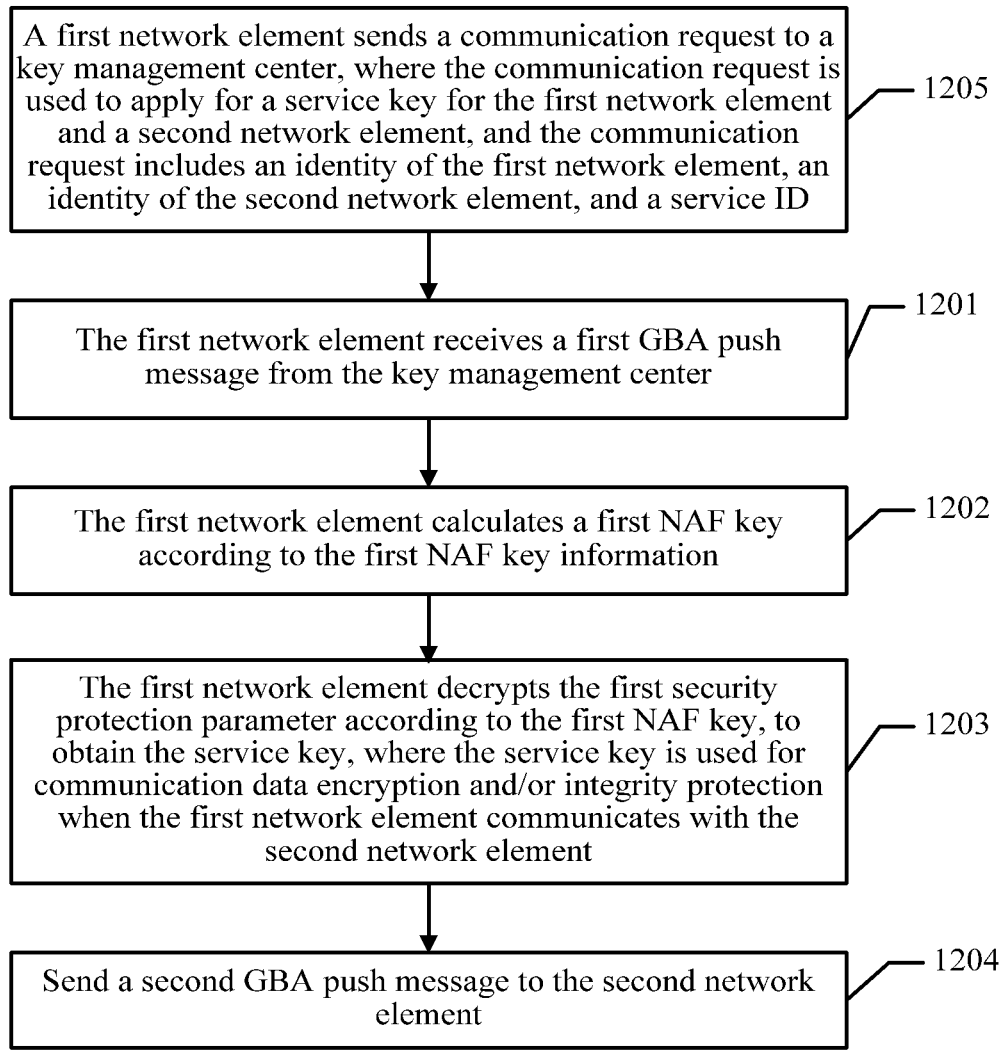
FIG. 12 is a schematic flowchart of one embodiment of a key receiving method according to the present invention.

Referring to FIG. 12. One embodiment of a key receiving method in the present invention includes the following steps.

1201. A first network element receives a first GBA push message from a key management center.

The first GBA push message carries a first security protection parameter and first NAF key information that are of the first network element.

In this embodiment, the first network element may be the network element 1 or the network element 2 in the communications system shown in FIG. 3, or the network element 41 or the network element 42 in the communications system shown in FIG. 4, or the network element 61 in the communications system shown in FIG. 6.

1202. The first network element calculates a first NAF key according to the first NAF key information.

1203. The first network element decrypts the first security protection parameter according to the first NAF key, to obtain a service key, where the service key is used for communication data encryption and/or integrity protection when the first network element communicates with a second network element.

Optionally, on a basis of the embodiment corresponding to FIG. 12, in a first optional embodiment of the key receiving method in the embodiments of the present invention, the first GBA push message further carries a second GBA push message, or the first network element further receives a second GBA push message sent by the key management center. The second GBA push message includes a second security protection parameter and second NAF key information that are of the second network element. The NAF key information of the second network element is information required to obtain a NAF key of the second network element. The second security protection parameter is generated by using the NAF key of the second network element to perform encryption and/or integrity protection on the service key by the key management center.

The method further includes the following step.

1204. Send a second GBA push message to the second network element.

Optionally, on a basis of the first optional embodiment of the key receiving method in the embodiments of the present invention, in a second optional embodiment of the key receiving method in the embodiments of the present invention, the second GBA push message further carries an identity of the second network element.

The sending a second GBA push message to the second network element in the step S1204 specifically includes obtaining the identity of the second network element from the second GBA push message, and sending the second GBA push message to the second network element corresponding to the identity.

Optionally, on a basis of the embodiment corresponding to FIG. 12, in a third optional embodiment of the key receiving method in the embodiments of the present invention, before the receiving, by a first network element, a first GBA push message from a key management center in the step S1201, the key receiving method further includes the following step 1205.

1205. The first network element sends a communication request to the key management center, where the communication request is used to apply for a service key for the first network element and a second network element, and the communication request includes an identity of the first network element, an identity of the second network element, and a service ID.

To better understand details about the embodiment corresponding to FIG. 12 or optional embodiments, refer to descriptions of the embodiments shown in FIG. 3, FIG. 5, and FIG. 7. Details are not described again.

Figure 13:
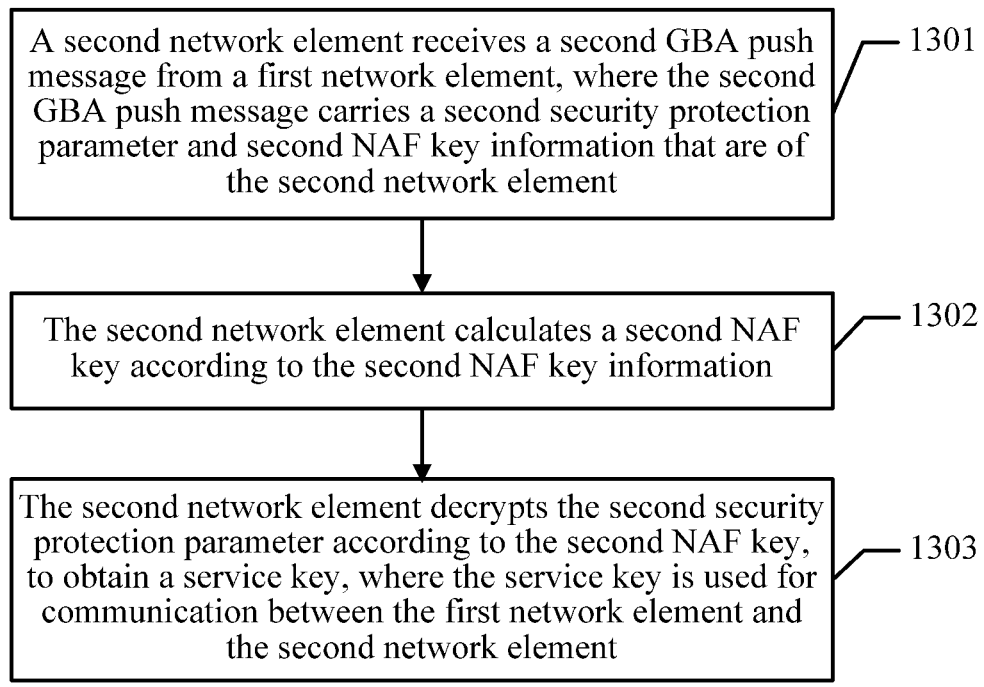
FIG. 13 is a schematic flowchart of another embodiment of a key receiving method according to the present invention.

Referring to FIG. 13. Another embodiment of a key receiving method in the present invention includes the following steps.

1301. A second network element receives a second GBA push message from a first network element, where the second GBA push message carries a second security protection parameter and second NAF key information that are of the second network element.

In this embodiment, the second network element may be the network element 1 or the network element 2 in the communications system shown in FIG. 3, or the network element 41 or the network element 42 in the communications system shown in FIG. 4, or the network element 61 in the communications system shown in FIG. 6.

1302. The second network element calculates a second NAF key according to the second NAF key information.

1303. The second network element decrypts the second security protection parameter according to the second NAF key, to obtain a service key, where the service key is used for communication between the first network element and the second network element.

To better understand details about the embodiment corresponding to FIG. 13 or optional embodiments, refer to descriptions of the embodiments shown in FIG. 3, FIG. 5, and FIG. 7. Details are not described again.

The key distribution method and the key receiving method in the embodiments of the present invention are described above. The following describes a first key management center in an embodiment of the present invention.

Figure 14:
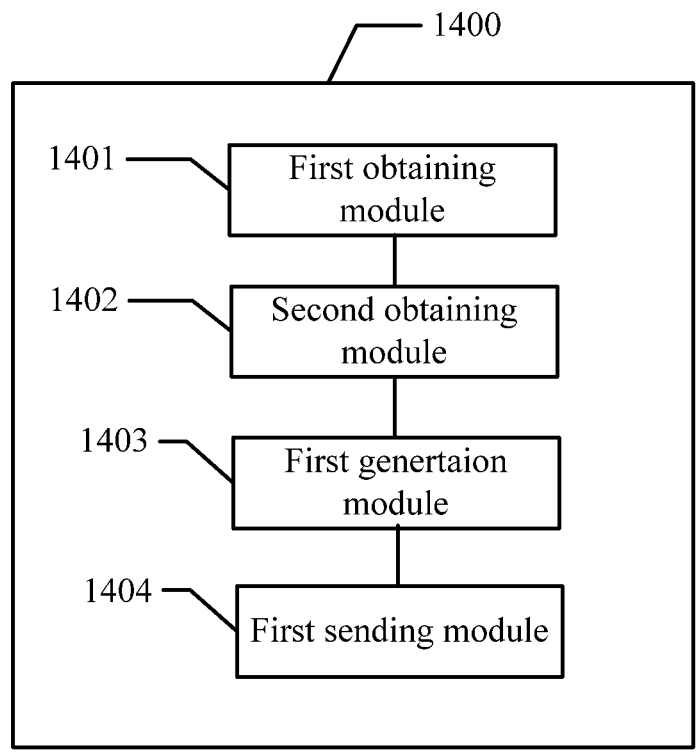
FIG. 14 is a schematic diagram of a structure of one embodiment of a first key management center according to the present invention.

Referring to FIG. 14. FIG. 14 is a schematic diagram of a structure of one embodiment of a first key management center according to the present invention. In this embodiment, a first key management center 1400 includes a first obtaining module 1401, configured to obtain application server NAF key information of a first network element and a NAF key of the first network element, where the NAF key information of the first network element is information required to obtain the NAF key of the first network element. The first key management center 1400 further includes a second obtaining module 1402, configured to obtain a service key, where the service key is used for communication data encryption and/or integrity protection when the first network element communicates with a second network element. The first key management center 1400 also includes a first generation module 1403, configured to use the NAF key of the first network element to perform encryption and/or integrity protection on the service key, to generate a first security protection parameter. The first key management center 1400 further still includes a first sending module 1404, configured to send a first generic bootstrapping architecture GBA push message to the first network element, where the first GBA push message carries the first security protection parameter and the NAF key information of the first network element.

In this embodiment, the first key management center sends a service key for communication between network elements to the network elements, so that data can be protected by using the service key when the network elements send the data to each other and data interception and attack in a sending process can be avoided. In addition, the first key management center further uses a NAF key to encrypt the service key, and sends the service key to the network elements by using a GBA message. The GBA message further carries NAF key information, so that the network elements generate the NAF key according to the NAF key information, and use the NAF key to restore the service key from the GBA message. This ensures service key security.

Figure 15:
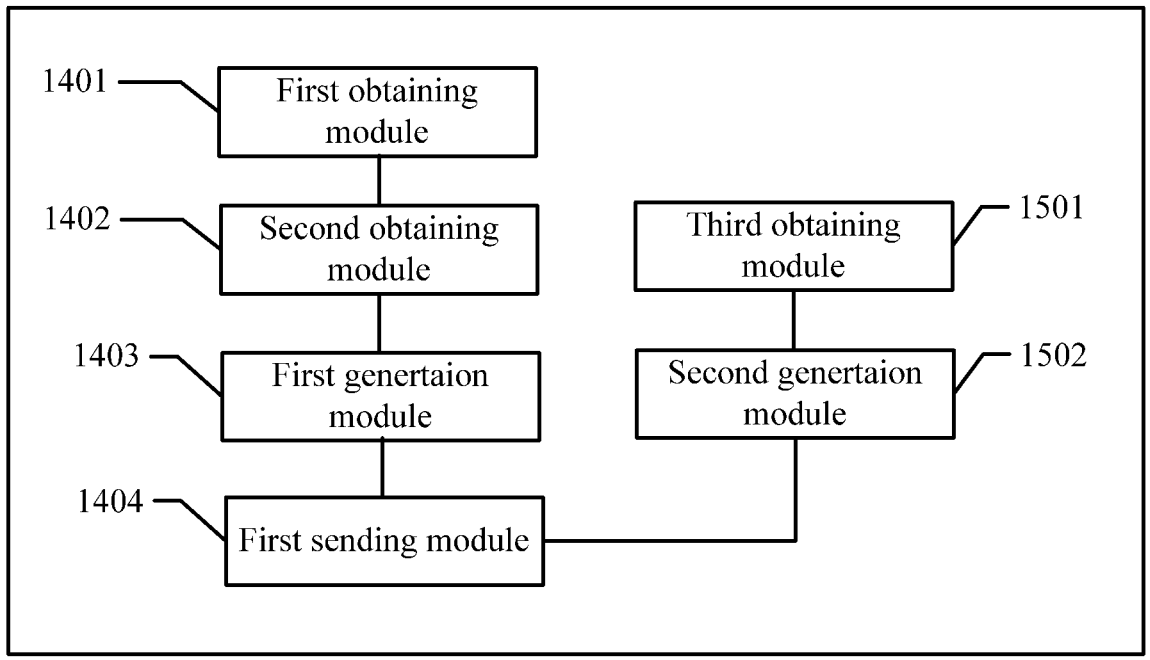
FIG. 15 is a schematic diagram of a structure of another embodiment of a first key management center according to the present invention.

As shown in FIG. 15, in some possible implementations of embodiments of the present invention, the first key management center 1500 further includes a third obtaining module 1501, configured to obtain NAF key information of the second network element and a NAF key of the second network element, where the NAF key information of the second network element is information required to obtain the NAF key of the second network element. The first key management center 1500 further also includes a second generation module 1502, configured to use the NAF key of the second network element to perform encryption and/or integrity protection on the service key, to generate a second security protection parameter.

The first sending module 1404 is further configured to perform one of the following steps C, D, or E. Step C includes adding a second GBA push message to the first GBA push message, so that the first network element sends the second GBA push message to the second network element. Step D includes sending a second GBA push message to the first network element, so that the first network element sends the second GBA push message to the second network element. Step E includes sending a second GBA push message to the second network element.

The second GBA push message carries the second security protection parameter and the NAF key information of the second network element.

Figure 16:
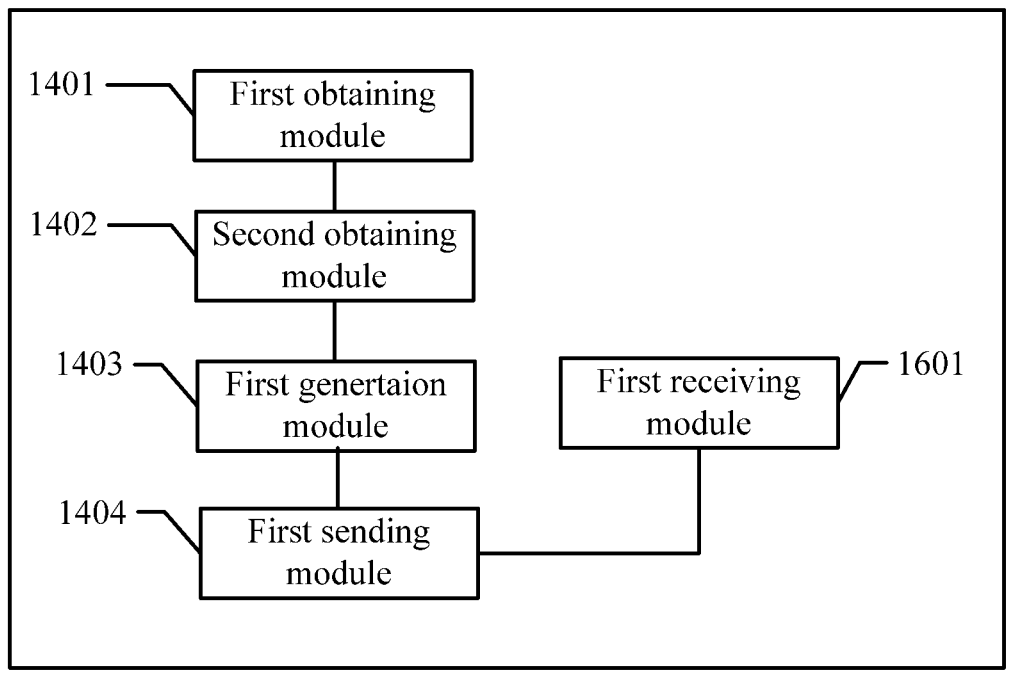
FIG. 16 is a schematic diagram of a structure of another embodiment of a first key management center according to the present invention.

On a basis of the embodiment shown in FIG. 14, in some possible implementations of embodiments of the present invention, as shown in FIG. 16, the first key management center further includes a first receiving module 1601, configured to receive a second GBA push message sent by the second key management center.

The second GBA push message carries a second security protection parameter and NAF key information of the second network element. The NAF key information of the second network element is information required to obtain a NAF key of the second network element. The second security protection parameter is generated by using the NAF key of the second network element to perform encryption and/or integrity protection on the service key by the second key management center.

The first sending module 1404 is further configured to perform one of the following steps F, G, or H. Step F includes adding the second GBA push message to the first GBA push message, so that the first network element sends the second GBA push message to the second network element. Step G includes sending the second GBA push message to the first network element, so that the first network element sends the second GBA push message to the second network element. Step H includes sending the second GBA push message to the second network element.

On a basis of the embodiment shown in FIG. 16, in some possible implementations of embodiments of the present invention, the second obtaining module 1402 is specifically configured to select a random number, where the service key includes the random number; the second obtaining module 1402 is specifically configured to negotiate the service key with the second key management center; the second obtaining module 1402 is specifically configured to receive the service key sent by the second key management center; or the second obtaining module 1402 is specifically configured to obtain a first parameter set and a second parameter set, and calculate a dependent variable of a preset key derivation function when the first parameter set and the second parameter set are independent variables of the preset key derivation function, where the service key includes the dependent variable.

The first parameter set includes at least one of the random number determined by the first key management center or the NAF key of the first network element. The second parameter set includes at least one of an identity, time indicating a validity period of the service key, or a serial number.

Further, in some possible implementations of embodiments of the present invention, the second obtaining module 1402 is specifically configured to receive a second random number and/or the NAF key of the second network element sent by the second key management center; and calculate a dependent variable of the preset key derivation function when at least one of the identity, the time indicating a validity period of the service key, the serial number, the random number determined by the first key management center, or the NAF key of the first network element and the second random number and/or the NAF key of the second network element are independent variables of the preset key derivation function, where the service key includes the dependent variable. The second obtaining module 1402 is alternatively specifically configured to obtain a first random number; send the first random number and/or the NAF key of the first network element to the second key management center; and receive the service key sent by the second key management center, where the service key is determined by the second key management center according to the first random number and/or the NAF key of the first network element. The second obtaining module 1402 is yet alternatively specifically configured to negotiate the service key with the second key management center by using a DH key negotiation method. The second obtaining module 1402 is further alternatively specifically configured to obtain a negotiation parameter by negotiating with the second key management center by means of DH key negotiation; and calculate a dependent variable of the preset key derivation function when the negotiation parameter is one of independent variables of the preset key derivation function, where the service key includes the dependent variable.

On a basis of the embodiment shown in FIG. 16, in some possible implementations of embodiments of the present invention, the second obtaining module 1402 is specifically configured to obtain a first parameter set and a second parameter set, where the service key includes the first parameter set and the second parameter set.

The first parameter set includes at least one of a random number determined by the first key management center, a random number determined by the second key management center, the NAF key of the first network element, or the NAF key of the second network element. The second parameter set includes at least one of an identity, time indicating a validity period of the service key, or a serial number.

On a basis of the embodiment shown in FIG. 14, in some possible implementations of embodiments of the present invention, a secure channel is established between the second network element and the first key management center.

The first sending module is further configured to send the service key to the second network element over the secure channel.

Figure 17:
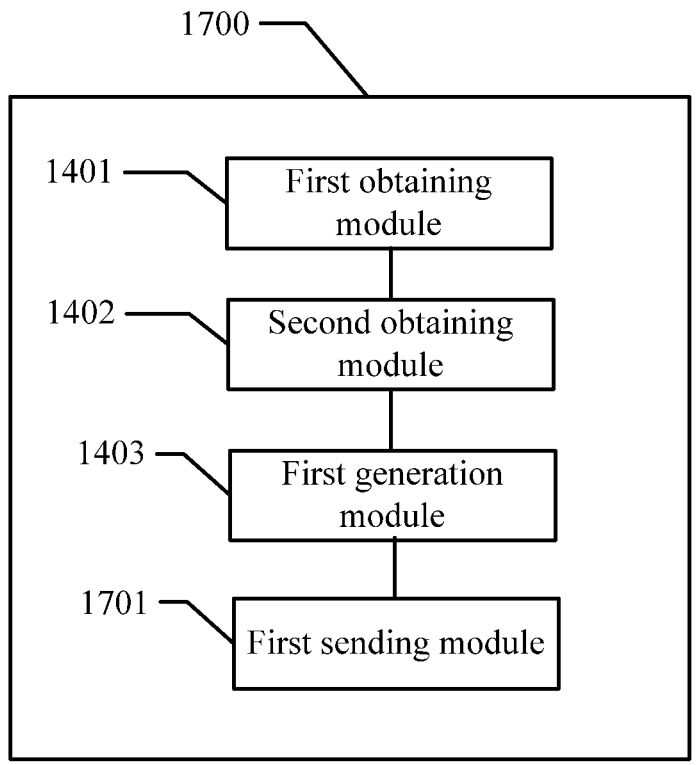
FIG. 17 is a schematic diagram of a structure of another embodiment of a first key management center according to the present invention.

Referring to FIG. 17. FIG. 17 is a schematic diagram of a structure of one embodiment of a first key management center according to the present invention. In this embodiment, a first key management center 1700 includes a first obtaining module 1401, configured to obtain application server NAF key information of a first network element and a NAF key of the first network element, where the NAF key information of the first network element is information required to obtain the NAF key of the first network element. The first key management center 1700 further includes a second obtaining module 1402, configured to obtain a service key, where the service key is used for communication data encryption and/or integrity protection when the first network element communicates with a second network element. The first key management center 1700 also includes a first generation module 1403, configured to use the NAF key of the first network element to perform encryption and/or integrity protection on the service key, to generate a first security protection parameter. The first key management center 1700 further still includes a first sending module 1701, configured to send a first GBA push message to a second key management center, so that the second key management center sends the first GBA push message to the first network element, or the second key management center sends the first GBA push message to the second network element, and the second network element sends the first GBA push message to the first network element, where the first GBA push message carries the first security protection parameter and the NAF key information of the first network element.

On a basis of the embodiment shown in FIG. 14, FIG. 15, or FIG. 17, in some possible implementations of embodiments of the present invention, the second obtaining module 1402 is specifically configured to select a random number, where the service key includes the random number. The second obtaining module 1402 is alternatively specifically configured to obtain a first parameter set and a second parameter set, and calculate a dependent variable of a preset key derivation function when the first parameter set and the second parameter set are independent variables of the preset key derivation function, where the service key includes the dependent variable. The second obtaining module 1402 is further alternatively specifically configured to obtain the first parameter set and the second parameter set, where the service key includes the first parameter set and the second parameter set.

The first parameter set includes at least one of the random number, the NAF key of the first network element, or the NAF key of the second network element. The second parameter set includes at least one of an identity, time indicating a validity period of the service key, or a serial number.

On a basis of the embodiment shown in FIG. 14 or FIG. 17, in some possible implementations of embodiments of the present invention, the first GBA push message carries an identity of the first network element.

Further, optionally, the first GBA push message includes a first GPI message, and the first GPI message carries the identity of the first network element; or the first GBA push message carries a first GPL message, and the first GPL message carries the identity of the first network element, or carries the identity of the first network element and length information of the identity.

In some possible implementations of embodiments of the present invention, the identity includes at least one of an IMSI, a GUTI, an IMPI, a TMSI, a TMPI, an IMPU, a service ID, a session ID, a network ID, a link ID, an App ID, or a gateway ID.

Figure 18:
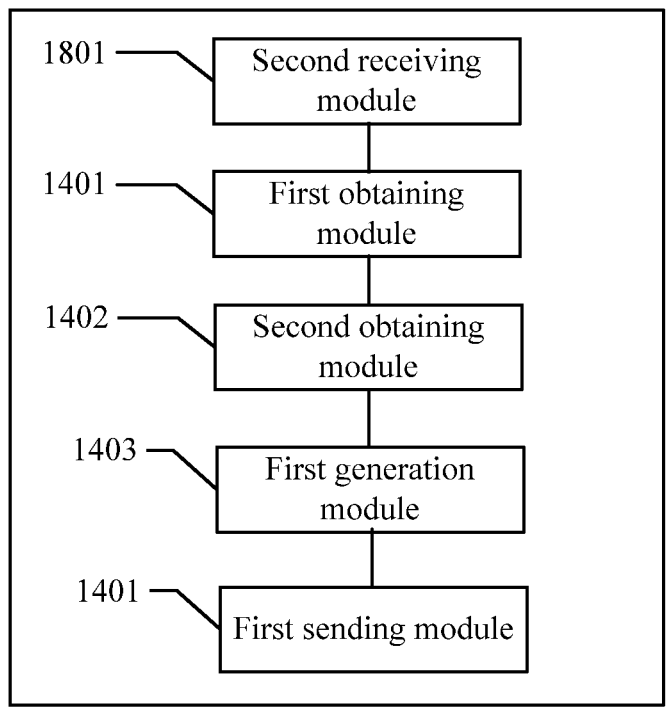
FIG. 18 is a schematic diagram of a structure of another embodiment of a first key management center according to the present invention.

On a basis of the embodiment shown in FIG. 14 or FIG. 17, in some possible implementations of embodiments of the present invention, as shown in FIG. 18, the first key management center further includes a second receiving module 1801, configured to receive a communication request sent by an initiator before the first obtaining module 1404 obtains the application server NAF key of the first network element.

The communication request is used to apply for a service key for data communication between the first network element and the second network element. The initiator is a data sender in the first network element and the second network element. The communication request includes an identity of the first network element and an identity of the second network element.

On a basis of the embodiment shown in FIG. 14 or FIG. 17, in some possible implementations of embodiments of the present invention, the first GBA push message further includes identity information of the service key.

The identity information includes at least one of time indicating a validity period of the service key, an identity of the first network element, an identity of the second network element, or a service ID. The service ID is used to indicate a service corresponding to the service ID when the service key is applied to the service.

For details about the first key management center, refer to descriptions of the embodiments of the key distribution method. Details are not described again.

The first key management center in an embodiment of the present invention is described above. The following describes a first network element and a second network element in embodiments of the present invention.

Figure 19:
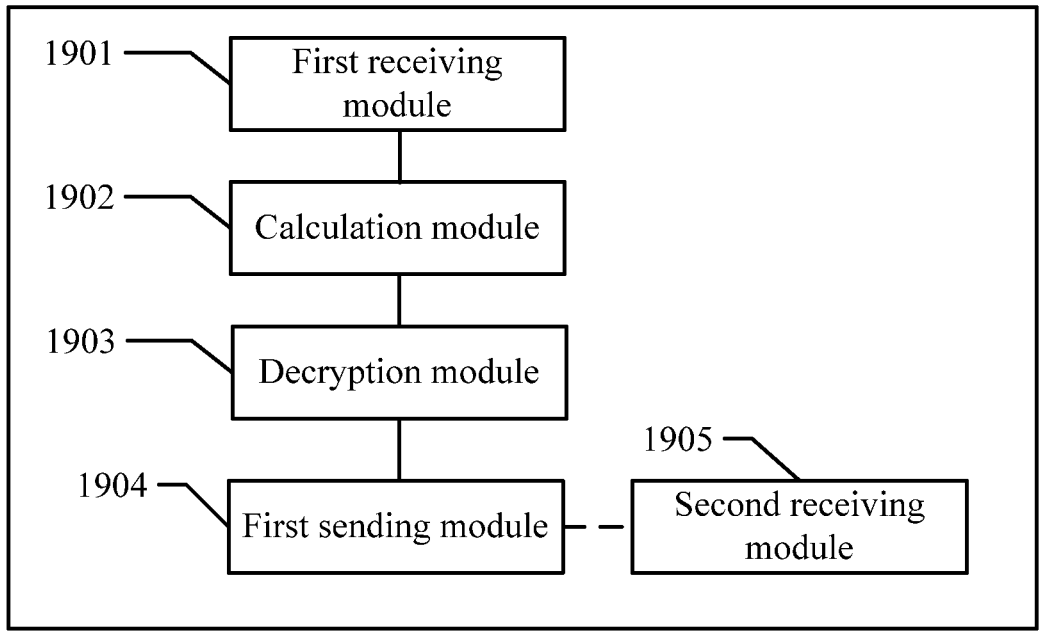
FIG. 19 is a schematic diagram of a structure of one embodiment of a first network element according to the present invention.

Referring to FIG. 19. FIG. 19 is a schematic diagram of a structure of one embodiment of a first network element according to the present invention. In this embodiment, a first network element 1900 includes a first receiving module 1901, configured to receive a first GBA push message from a key management center, where the first GBA push message carries a first security protection parameter and first NAF key information that are of the first network element. The first network element 1900 further includes a calculation module 1902, configured to calculate a first NAF key according to the first NAF key information. The first network element 1900 also includes a decryption module 1903, configured to decrypt the first security protection parameter according to the first NAF key, to obtain a service key, where the service key is used for communication data encryption and/or integrity protection when the first network element communicates with a second network element.

In some possible implementations of embodiments of the present invention, the first GBA push message further carries a second GBA push message. The first network element further includes a first sending module 1904, configured to send the second GBA push message to the second network element. In some possible implementations of embodiments of the present invention, the first network element further includes a second receiving module 1905, configured to receive a second GBA push message sent by the key management center. The second GBA push message includes a second security protection parameter and second NAF key information that are of the second network element. The NAF key information of the second network element is information required to obtain a NAF key of the second network element. The second security protection parameter is generated by using the NAF key of the second network element to perform encryption and/or integrity protection on the service key by the key management center. The first network element 1900 further includes a first sending module 1904, configured to send the second GBA push message to the second network element.

Further, optionally, the second GBA push message further carries an identity of the second network element.

The first sending module is specifically configured to obtain the identity of the second network element from the second GBA push message; and send the second GBA push message to the second network element corresponding to the identity.

Figure 20:
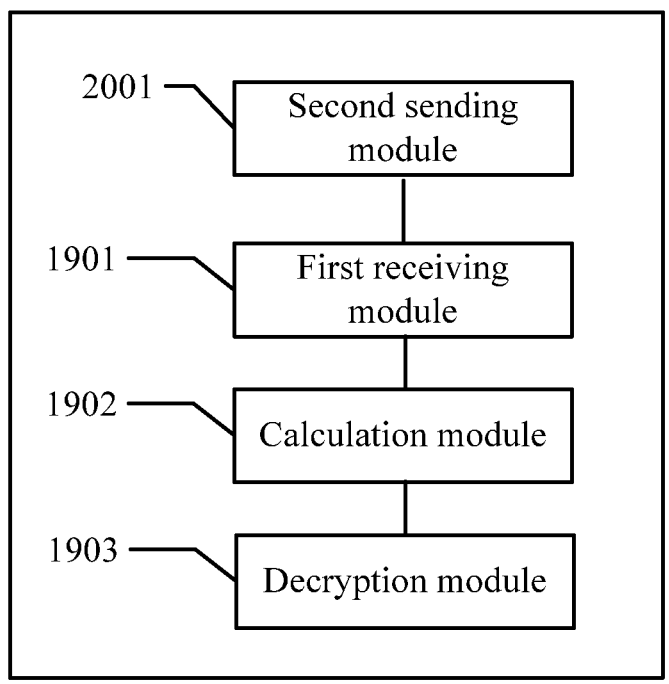
FIG. 20 is a schematic diagram of a structure of another embodiment of a first network element according to the present invention.

As shown in FIG. 20, in some possible implementations of embodiments of the present invention, the first network element further includes a second sending module 2001, configured to send a communication request to the key management center, where the communication request is used to apply for a service key for the first network element and a second network element, and the communication request includes an identity of the first network element, an identity of the second network element, and a service ID.

Figure 21:
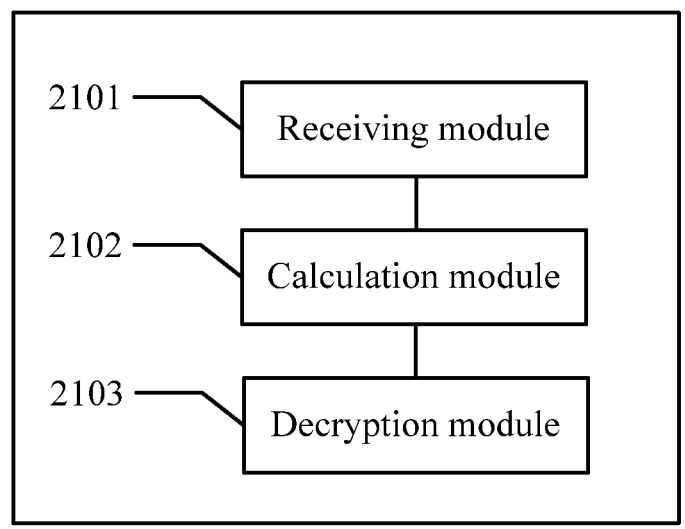
FIG. 21 is a schematic diagram of a structure of one embodiment of a second network element according to the present invention.

Referring to FIG. 21. FIG. 21 is a schematic diagram of a structure of one embodiment of a second network element according to the present invention. In this embodiment, a second network element 2100 includes a receiving module 2101, configured to receive a second GBA push message from a first network element, where the second GBA push message carries a second security protection parameter and second NAF key information that are of the second network element. The second network element 2100 further includes a calculation module 2102, configured to calculate a second NAF key according to the second NAF key information. The second network element 2100 also includes a decryption module 2103, configured to decrypt the second security protection parameter according to the second NAF key, to obtain a service key, where the service key is used for communication between the first network element and the second network element.

For details about the first network element and the second network element, refer to descriptions of the embodiments of the key receiving method. Details are not described again.

The foregoing describes the first key management center, the first network element, and the second network element in the embodiments of the present invention from a perspective of a unit-based functional entity. The following describes the first key management center, the first network element, and the second network element in the embodiments of the present invention from a perspective of hardware processing.

Figure 22:
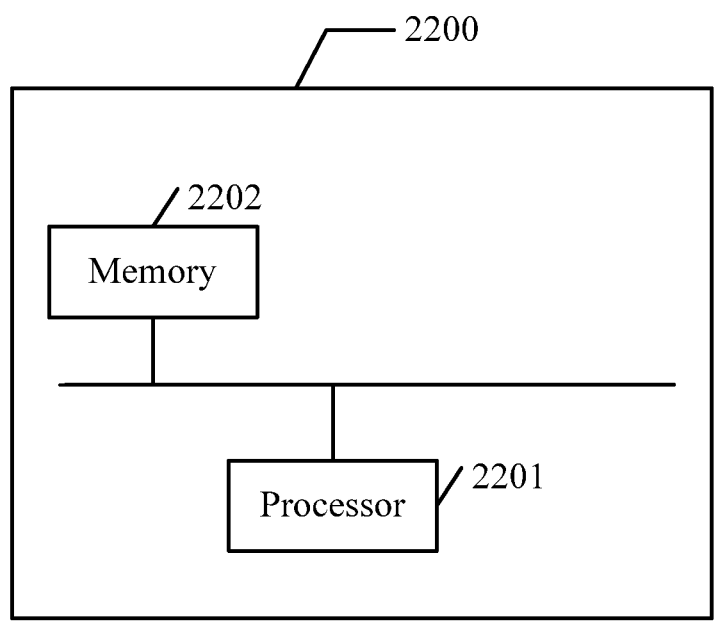
FIG. 22 is a schematic diagram of a structure of one embodiment of a first key management center according to the present invention.

Referring to FIG. 22. FIG. 22 is a schematic diagram of a structure of one embodiment of a first key management center according to the present invention. In this embodiment, a first key management center 2200 includes a processor 2201, and a memory 2202 coupled to the processor 2201, where the processor 2201 reads a computer program stored in the memory 2202 to perform the following operations. The processor performs the operation of obtaining application server NAF key information of a first network element and a NAF key of the first network element, where the NAF key information of the first network element is information required to obtain the NAF key of the first network element. The processor further performs the operation of obtaining a service key, where the service key is used for communication data encryption and/or integrity protection when the first network element communicates with a second network element. The processor also performs the operation of using the NAF key of the first network element to perform encryption and/or integrity protection on the service key, to generate a first security protection parameter. The processor further still performs either of the following steps A or B. Step A includes sending a first generic bootstrapping architecture GBA push message to the first network element, where the first GBA push message carries the first security protection parameter and the NAF key information of the first network element. Step B includes sending a first GBA push message to a second key management center, so that the second key management center sends the first GBA push message to the first network element, or the second key management center sends the first GBA push message to the second network element, and the second network element sends the first GBA push message to the first network element, where the first GBA push message carries the first security protection parameter and the NAF key information of the first network element.

In a first possible implementation of embodiments of the present invention, when the processor 2201 performs the step A, the processor 2201 further performs the following operations. The processor performs the operation of obtaining NAF key information of the second network element and a NAF key of the second network element, where the NAF key information of the second network element is information required to obtain the NAF key of the second network element. The processor further performs the operation of using the NAF key of the second network element to perform encryption and/or integrity protection on the service key, to generate a second security protection parameter. The processor also performs one of the following steps C, D, or E. Step C includes adding a second GBA push message to the first GBA push message, so that the first network element sends the second GBA push message to the second network element. Step D includes sending a second GBA push message to the first network element, so that the first network element sends the second GBA push message to the second network element. Step E includes sending a second GBA push message to the second network element.

The second GBA push message carries the second security protection parameter and the NAF key information of the second network element.

On a basis of the embodiment shown in FIG. 22, or the first possible implementation of embodiments of the present invention, in some possible implementations of embodiments of the present invention, obtaining a service key includes selecting a random number, where the service key includes the random number; obtaining a first parameter set and a second parameter set, and calculating a dependent variable of a preset key derivation function when the first parameter set and the second parameter set are independent variables of the preset key derivation function, where the service key includes the dependent variable; or obtaining the first parameter set and the second parameter set, where the service key includes the first parameter set and the second parameter set.

The first parameter set includes at least one of the random number, the NAF key of the first network element, or the NAF key of the second network element. The second parameter set includes at least one of an identity, time indicating a validity period of the service key, or a serial number.

On a basis of the embodiment shown in FIG. 22, in a second possible implementation of embodiments of the present invention, when the processor 2201 performs the step A, the processor 2201 further performs the following operations. The processor receives, by the first key management center, a second GBA push message sent by the second key management center, where the second GBA push message carries a second security protection parameter and NAF key information of the second network element. The NAF key information of the second network element is information required to obtain a NAF key of the second network element. The second security protection parameter is generated by using the NAF key of the second network element to perform encryption and/or integrity protection on the service key by the second key management center. The processor performs one of the following steps F, G, or H. Step F includes adding the second GBA push message to the first GBA push message, so that the first network element sends the second GBA push message to the second network element. Step G includes sending the second GBA push message to the first network element, so that the first network element sends the second GBA push message to the second network element. Step H includes sending the second GBA push message to the second network element.

Further, optionally, obtaining a service key includes selecting a random number, where the service key includes the random number; negotiating the service key with the second key management center; receiving the service key sent by the second key management center; or obtaining a first parameter set and a second parameter set, and calculating a dependent variable of a preset key derivation function when the first parameter set and the second parameter set are independent variables of the preset key derivation function, where the service key includes the dependent variable.

The first parameter set includes at least one of the random number determined by the first key management center or the NAF key of the first network element. The second parameter set includes at least one of an identity, time indicating a validity period of the service key, or a serial number.

Further, optionally, negotiating the service key with the second key management center includes receiving, a second random number and/or the NAF key of the second network element sent by the second key management center; and calculating a dependent variable of the preset key derivation function when at least one of the identity, the time indicating a validity period of the service key, the serial number, the random number determined by the first key management center, or the NAF key of the first network element and the second random number and/or the NAF key of the second network element are independent variables of the preset key derivation function, where the service key includes the dependent variable.

Alternatively, further, optionally, negotiating the service key with the second key management center includes obtaining a first random number; sending the first random number and/or the NAF key of the first network element to the second key management center; and receiving the service key sent by the second key management center, where the service key is determined by the second key management center according to the first random number and/or the NAF key of the first network element.

Alternatively, further, optionally, negotiating the service key with the second key management center includes negotiating the service key with the second key management center by using a DH key negotiation method.

Alternatively, further, optionally, negotiating the service key with the second key management center includes obtaining a negotiation parameter by negotiating with the second key management center by means of DH key negotiation; and calculating a dependent variable of the preset key derivation function when the negotiation parameter is one of independent variables of the preset key derivation function, where the service key includes the dependent variable.

On a basis of the second possible implementation of embodiments of the present invention, in a third possible implementation of embodiments of the present invention, the obtaining a service key includes obtaining a first parameter set and a second parameter set, where the service key includes the first parameter set and the second parameter set.

The first parameter set includes at least one of a random number determined by the first key management center, a random number determined by the second key management center, the NAF key of the first network element, or the NAF key of the second network element. The second parameter set includes at least one of an identity, time indicating a validity period of the service key, or a serial number.

In a fourth possible implementation of embodiments of the present invention, a secure channel is established between the second network element and the first key management center. When the first key management center performs the step A, the key distribution method further includes sending the service key to the second network element over the secure channel.

In a fifth possible implementation of embodiments of the present invention, the first GBA push message carries an identity of the first network element.

Further, optionally, the first GBA push message includes a first GPI message, and the first GPI message carries the identity of the first network element; or the first GBA push message carries a first GPL message, and the first GPL message carries the identity of the first network element, or carries the identity of the first network element and length information of the identity.

Optionally, the identity includes at least one of an IMSI, a GUTI, an IMPI, a TMSI, a TMPI, an IMPU, a service ID, a session ID, a network ID, a link ID, an App ID, or a gateway ID.

Optionally, before the obtaining, by a first key management center, an application server NAF key of the first network element, the processor 2201 further receives, by the first key management center, a communication request sent by an initiator, where the communication request is used to apply for a service key for data communication between the first network element and a second network element, the initiator is a data sender in the first network element and the second network element, and the communication request includes an identity of the first network element and an identity of the second network element.

Optionally, the first GBA push message further carries identity information of the service key.

The identity information includes at least one of time indicating a validity period of the service key, an identity of the first network element, an identity of the second network element, or a service ID. The service ID is used to indicate a service corresponding to the service ID when the service key is applied to the service.

Figure 23:
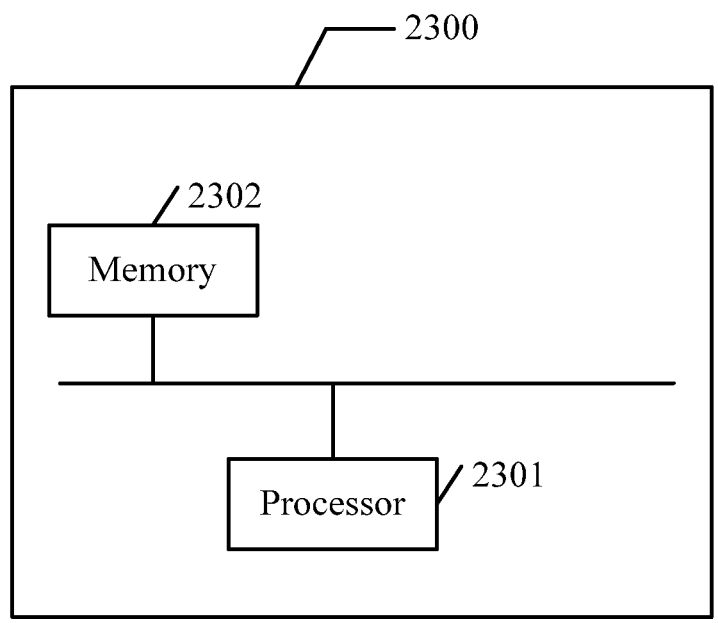
FIG. 23 is a schematic diagram of a structure of one embodiment of a first network element according to the present invention.

Referring to FIG. 23. FIG. 23 is a schematic diagram of a structure of one embodiment of a first network element according to the present invention. In this embodiment, a first network element 2300 includes a processor 2301, and a memory 2302 coupled to the processor 2301, where the processor 2301 reads a computer program stored in the memory 2302 to perform the following operations. A first GBA push message is received from a key management center, where the first GBA push message carries a first security protection parameter and first NAF key information that are of the first network element. A first NAF key is calculated according to the first NAF key information. The first security protection parameter is decrypted according to the first NAF key, to obtain a service key, where the service key is used for communication data encryption and/or integrity protection when the first network element communicates with a second network element.

Optionally, the first GBA push message further carries a second GBA push message.

The processor 2301 is further configured to perform the following operation of sending the second GBA push message to the second network element.

Optionally, the processor 2301 is further configured to perform the following operation of receiving a second GBA push message sent by the key management center, where the second GBA push message includes a second security protection parameter and second NAF key information that are of the second network element; the NAF key information of the second network element is information required to obtain a NAF key of the second network element; and the second security protection parameter is generated by using the NAF key of the second network element to perform encryption and/or integrity protection on the service key by the key management center. The second GBA push message is sent to the second network element.

Further, optionally, the second GBA push message further carries an identity of the second network element.

Sending the second GBA push message to the second network element includes obtaining the identity of the second network element from the second GBA push message, and sending the second GBA push message to the second network element corresponding to the identity.

Optionally, before the receiving, by a first network element, a first GBA push message from a key management center, the processor 2301 further includes performing the operation of sending, by the first network element, a communication request to the key management center, where the communication request is used to apply for a service key for the first network element and a second network element, and the communication request includes an identity of the first network element, an identity of the second network element, and a service ID.

Figure 24:
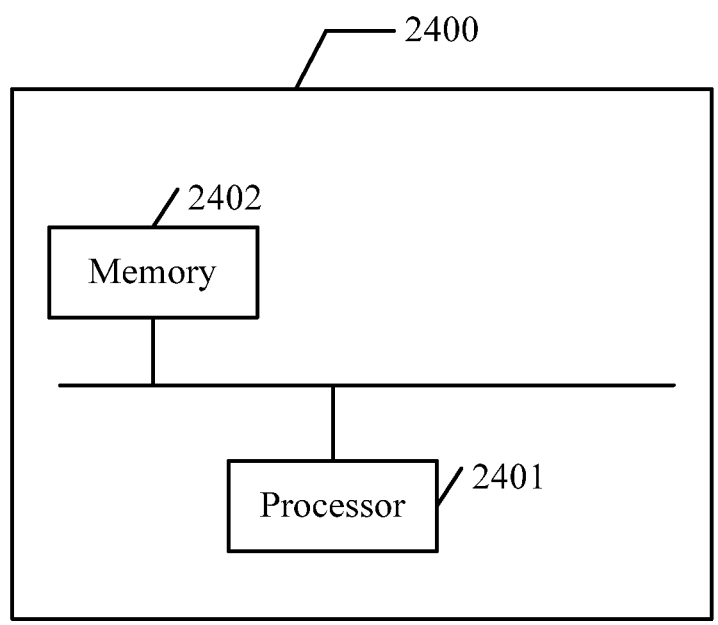
FIG. 24 is a schematic diagram of a structure of one embodiment of a second network element according to the present invention.

Referring to FIG. 24. FIG. 24 is a schematic diagram of a structure of one embodiment of a second network element according to the present invention. In this embodiment, a second network element 2400 includes a processor 2401, and a memory 2402 coupled to the processor 2401, where the processor 2401 reads a computer program stored in the memory 2402 to perform the following operations. A second GBA push message is received from a first network element, where the second GBA push message carries a second security protection parameter and second NAF key information that are of the second network element. A second NAF key is calculated according to the second NAF key information. The second security protection parameter is decrypted according to the second NAF key, to obtain a service key, where the service key is used for communication between the first network element and the second network element.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of embodiments of the present invention, but not for limiting the present disclosure. Although embodiments of the present invention are described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
    obtaining, by a first key management center, application server (NAF) key information of a first network element and a NAF key of the first network element, wherein the NAF key information is required to obtain the NAF key;
    obtaining, by the first key management center, a service key, wherein the first network element uses the service key for communication data encryption or integrity protection to communicate with a second network element;
    using, by the first key management center, the NAF key to perform encryption or integrity protection on the service key to generate a first security protection parameter; and
    sending a first generic bootstrapping architecture (GBA) push message to the first network element, wherein the first GBA push message carries the first security protection parameter and the NAF key information.

2. The method according to claim 1, further comprising:
    obtaining, by the first key management center, NAF key information of the second network element and a NAF key of the second network element, wherein the NAF key information of the second network element is information required to obtain the NAF key of the second network element;
    using, by the first key management center, the NAF key of the second network element to perform encryption or integrity protection on the service key, to generate a second security protection parameter; and
    providing a second GBA push message to the second network element, the second GBA push message comprising the second security protection parameter and the NAF key information of the second network element.

3. The method according to claim 2, wherein providing the second GBA push message comprises:
    adding the second GBA push message to the first GBA push message, wherein the first network element sends the second GBA push message to the second network element.

4. The method according to claim 1, wherein obtaining the service key comprises:
    obtaining a first parameter set and a second parameter set; and
    calculating a dependent variable of a preset key derivation function, wherein the first parameter set and the second parameter set are independent variables of the preset key derivation function, wherein the service key comprises the dependent variable, wherein the first parameter set comprises a random number, the NAF key of the first network element, or the NAF key of the second network element, and wherein the second parameter set comprises an identity, time indicating a validity period of the service key, or a serial number.

5. The method according to claim 1, further comprising:
    receiving, by the first key management center, a second GBA push message sent by a second key management center, wherein the second GBA push message carries a second security protection parameter and NAF key information of a second network element, wherein the NAF key information of the second network element is information required to obtain a NAF key of the second network element, and wherein the second security protection parameter is generated by using the NAF key of the second network element to perform encryption or integrity protection on the service key by the second key management center; and
    adding the second GBA push message to the first GBA push message, the first network element sending the second GBA push message to the second network element.

6. The method according to claim 5, wherein obtaining the service key comprises:
    obtaining a first parameter set and a second parameter set; and
    calculating a dependent variable of a preset key derivation function, wherein the first parameter set and the second parameter set are independent variables of the preset key derivation function, wherein the service key comprises the dependent variable, wherein the first parameter set comprises a random number determined by the first key management center or the NAF key of the first network element, and wherein the second parameter set comprises a time indicating a validity period of the service key.

7. A method, comprising:
    receiving, by a first network element, a first generic bootstrapping architecture (GBA) push message from a key management center, wherein the first GBA push message carries a first security protection parameter and first application server (NAF) key information that are of the first network element;
    in response to receiving the first GBA push message, calculating, by the first network element, a first NAF key according to the first NAF key information comprised in the first GBA push message;
    in response to calculating the first NAF key, decrypting, by the first network element, the first security protection parameter using the first NAF key, to obtain a service key; and
    communicating, by the first network element, with a second network element using the service key for communication data encryption or integrity protection.

8. The method according to claim 7, wherein the first network element further receives a second GBA push message sent by the key management center, wherein the second GBA push message comprises a second security protection parameter and second NAF key information of the second network element, wherein the second NAF key information of the second network element is information required to obtain a second NAF key of the second network element, and wherein the second security protection parameter is generated by using the second NAF key of the second network element to perform encryption or integrity protection on the service key by the key management center, and wherein the method further comprises:
    sending the second GBA push message to the second network element.

9. The method according to claim 8, wherein the second GBA push message further carries an identity of the second network element, wherein sending the second GBA push message to the second network element comprises:
    obtaining the identity of the second network element from the second GBA push message; and
    sending the second GBA push message to the second network element corresponding to the identity.

10. The method according to claim 7, further comprising:
before receiving the first GBA push message, sending, by the first network element, a communication request to the key management center, wherein the key management center uses the communication request to apply for a service key for the first network element and the second network element, and the communication request comprises an identity of the first network element, an identity of the second network element, and a service ID.

11. A first key management center, comprising:
a processor; and
a non-transitory computer-readable storage medium storing a program to be executed by the processor, the program including instructions for:
  obtaining application server (NAF) key information of a first network element and a NAF key of the first network element, wherein the NAF key information of the first network element is information required to obtain the NAF key of the first network element;
  obtaining a service key, wherein the first network element uses the service key for communication data encryption or integrity protection to communicate with a second network element;
  using the NAF key of the first network element to perform encryption or integrity protection on the service key to generate a first security protection parameter; and
  sending a first generic bootstrapping architecture (GBA) push message to the first network element, wherein the first GBA push message carries the first security protection parameter and the NAF key information of the first network element.

12. The first key management center according to claim 11, wherein the program further includes instructions for:
  obtaining NAF key information of a second network element and a NAF key of the second network element, wherein the NAF key information of the second network element is information required to obtain the NAF key of the second network element;
  performing encryption or integrity protection on the service key by the NAF key of the second network element to generate a second security protection parameter; and
  providing a second GBA push message to the second network element, the second GBA push message comprising the second security protection parameter and the NAF key information of the second network element.

13. The first key management center according to claim 12, wherein providing the second GBA push message comprises:
  adding the second GBA push message to the first GBA push message, wherein the first network element sends the second GBA push message to the second network element.

14. The first key management center according to claim 11, wherein obtaining the service key comprises:
  obtaining a first parameter set and a second parameter set; and
  calculating a dependent variable of a preset key derivation function when the first parameter set and the second parameter set are independent variables of the preset key derivation function, wherein the service key comprises the dependent variable, wherein the first parameter set comprises a random number, the NAF key of the first network element, or the NAF key of the second network element, and wherein the second parameter set comprises an identity, time indicating a validity period of the service key, or a serial number.

15. The first key management center according to claim 11, wherein the program further includes instructions for:
  receiving a second GBA push message sent by a second key management center, wherein the second GBA push message carries a second security protection parameter and NAF key information of a second network element, wherein the NAF key information of the second network element is information required to obtain a NAF key of the second network element, and wherein the second security protection parameter is generated by using the NAF key of the second network element to perform encryption or integrity protection on the service key by the second key management center; and
  adding the second GBA push message to the first GBA push message, wherein the first network element sends the second GBA push message to the second network element.

16. The first key management center according to claim 15, wherein obtaining the service key comprises:
  obtaining a first parameter set and a second parameter set; and
  calculating a dependent variable of a preset key derivation function when the first parameter set and the second parameter set are independent variables of the preset key derivation function, wherein the service key comprises the dependent variable, wherein the first parameter set comprises a random number determined by the first key management center or the NAF key of the first network element, and wherein the second parameter set comprises at an identity, a time indicating a validity period of the service key, or a serial number.

17. A first network element, comprising:
a processor; and
a non-transitory computer-readable storage medium storing a program to be executed by the processor, the program including instructions for:
  receiving a first generic bootstrapping architecture (GBA) push message from a key management center, wherein the first GBA push message carries a first security protection parameter and first application server (NAF) key information that are of the first network element;
  in response to receiving the first GBA push message, calculating a first NAF key according to the first NAF key information; and
  in response to calculating the first NAF key, decrypting the first security protection parameter using the first NAF key, to obtain a service key; and
  communicating with a second network element using the service key for communication data encryption or integrity protection.

18. The first network element according to claim 17, wherein the program further includes instructions for:
  receiving a second GBA push message sent by the key management center, wherein the second GBA push message comprises a second security protection parameter and second NAF key information that are of the second network element, wherein the second NAF key information of the second network element is information required to obtain a second NAF key of the second network element, and wherein the second security protection parameter is generated by using the second NAF key of the second network element to perform encryption or integrity protection on the service key by the key management center; and sending the second GBA push message to the second network element.

19. The first network element according to claim 18, wherein the second GBA push message further carries an identity of the second network element, and wherein sending the second GBA push message to the second network element comprises:

obtaining the identity of the second network element from the second GBA push message; and sending the second GBA push message to the second network element corresponding to the identity.

20. The first network element according to claim 17, wherein the program further includes instructions for:

before receiving the first GBA push message, sending a communication request to the key management center, wherein the communication request uses the communication request to apply for a service key for the first network element and a second network element, and the communication request comprises an identity of the first network element, an identity of the second network element, and a service ID.

\* \* \* \* \*